US009763225B2

(12) United States Patent
Ji et al.

(10) Patent No.: US 9,763,225 B2
(45) Date of Patent: Sep. 12, 2017

(54) LTE-U CLEAR CHANNEL ASSESSMENT OPERATIONS

(71) Applicant: QUALCOMM Incorporated, San Diego, CA (US)

(72) Inventors: Tingfang Ji, San Diego, CA (US); Naga Bhushan, San Diego, CA (US); Yongbin Wei, San Diego, CA (US); Peter Gaal, San Diego, CA (US); Tao Luo, San Diego, CA (US); Wanshi Chen, San Diego, CA (US); Durga Prasad Malladi, San Diego, CA (US); Aleksandar Damnjanovic, Del Mar, CA (US); Kiran Kumar Somasundaram, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 14/507,727

(22) Filed: Oct. 6, 2014

(65) Prior Publication Data

US 2015/0099525 A1 Apr. 9, 2015

Related U.S. Application Data

(60) Provisional application No. 61/887,922, filed on Oct. 7, 2013.

(51) Int. Cl.
*H04W 72/04* (2009.01)
*H04W 72/12* (2009.01)
*H04W 74/08* (2009.01)

(52) U.S. Cl.
CPC ....... *H04W 72/04* (2013.01); *H04W 72/1215* (2013.01); *H04W 74/0808* (2013.01)

(58) Field of Classification Search
CPC ............ H04W 72/04; H04W 72/1215; H04W 72/0446; H04L 5/0092; H04L 5/0062
(Continued)

(56) References Cited

U.S. PATENT DOCUMENTS

2006/0193299 A1* 8/2006 Winget ............... H04L 63/0492
370/338
2006/0239368 A1* 10/2006 Hwang ............... H04L 27/2676
375/260
(Continued)

FOREIGN PATENT DOCUMENTS

GB 2498988 A 8/2013
WO 2012052050 A1 4/2012
(Continued)

OTHER PUBLICATIONS

International Search Report and Written Opinion—PCT/US2014/059544—ISA/EPO—dated Jun. 11, 2015.
(Continued)

*Primary Examiner* — Kashif Siddiqui
(74) *Attorney, Agent, or Firm* — Harrity & Harrity, LLP

(57) ABSTRACT

The subject technology provides for performing clear channel assessment (CCA) in LTE-U. Transmissions may be monitored in a resource reserved for CCA. An energy of the transmissions is detected over a shorter duration than an assigned slot in the resource reserved for CCA. A beacon may be transmitted in a slot assigned to a wireless entity for CCA in response to detecting a clear channel based on the monitoring. In another aspect, a beacon transmission for CCA and a timing for the monitoring are adapted in response to detecting the transmissions for a consecutive number of CCA periods. Further, the subject technology provides for adjusting to a maximum power for transmission of a beacon
(Continued)

in a slot assigned to a mobile station for CCA in response to detecting a clear channel based on the monitoring.

46 Claims, 22 Drawing Sheets

(58) Field of Classification Search
USPC .............................................. 455/450, 456.1
See application file for complete search history.

(56) References Cited

U.S. PATENT DOCUMENTS

| | | | |
|---|---|---|---|
| 2007/0165573 A1* | 7/2007 | Hietalahti | H04W 8/02 370/331 |
| 2008/0112380 A1* | 5/2008 | Fischer | H04W 74/0816 370/338 |
| 2008/0192810 A1* | 8/2008 | Razzell | H04L 27/0006 375/150 |
| 2008/0212476 A1* | 9/2008 | Konradsson | H04W 74/085 370/235 |
| 2008/0232256 A1* | 9/2008 | Douglas | H04L 45/00 370/237 |
| 2009/0103501 A1* | 4/2009 | Farrag | H04W 74/02 370/337 |
| 2010/0014460 A1* | 1/2010 | Shin | H04J 3/0679 370/328 |
| 2011/0182201 A1* | 7/2011 | Pajukoski | H04B 17/24 370/252 |
| 2012/0008704 A1* | 1/2012 | Shetty | H04W 16/14 375/285 |
| 2012/0182963 A1* | 7/2012 | Kneckt | H04W 72/0453 370/330 |
| 2012/0257513 A1* | 10/2012 | Yamada | H04L 1/0618 370/248 |
| 2013/0016642 A1* | 1/2013 | Banerjea | H04L 27/2613 370/311 |
| 2013/0051260 A1* | 2/2013 | Liu | H04L 27/2613 370/252 |
| 2013/0265961 A1* | 10/2013 | Van Phan | H04W 4/00 370/329 |
| 2013/0286959 A1* | 10/2013 | Lou | H04W 72/04 370/329 |
| 2013/0303215 A1* | 11/2013 | Piipponen | H04W 24/02 455/501 |
| 2014/0004865 A1* | 1/2014 | Bhargava | H04W 74/0816 455/445 |

FOREIGN PATENT DOCUMENTS

| | | |
|---|---|---|
| WO | 2012139278 A1 | 10/2012 |
| WO | 2013006988 A1 | 1/2013 |

OTHER PUBLICATIONS

Nokia Siemens Networks, "Performance of 3GPP Rel-9 LTE positioning methods", Jun. 14, 2010 (Jun. 14, 2010), XP055192426, Retrieved from the Internet: URL:http://www.cwins.wpi.edu/workshop10/pres/std_2.pdf.
Partial International Search Report—PCT/US2014/059544—ISA/EPO—dated Mar. 4, 2015.
Ratasuk R. et al., "License-exempt LTE deployment in heterogeneous network", Wireless Communication Systems (ISWCS), 2012 International Symposium on, IEEE, Aug. 28, 2012 (Aug. 28, 2012), pp. 246-250, XP032263759, DOI: 10.1109/ISWCS. 2012.6328367, ISBN: 978-1-4673-0761-1.

\* cited by examiner

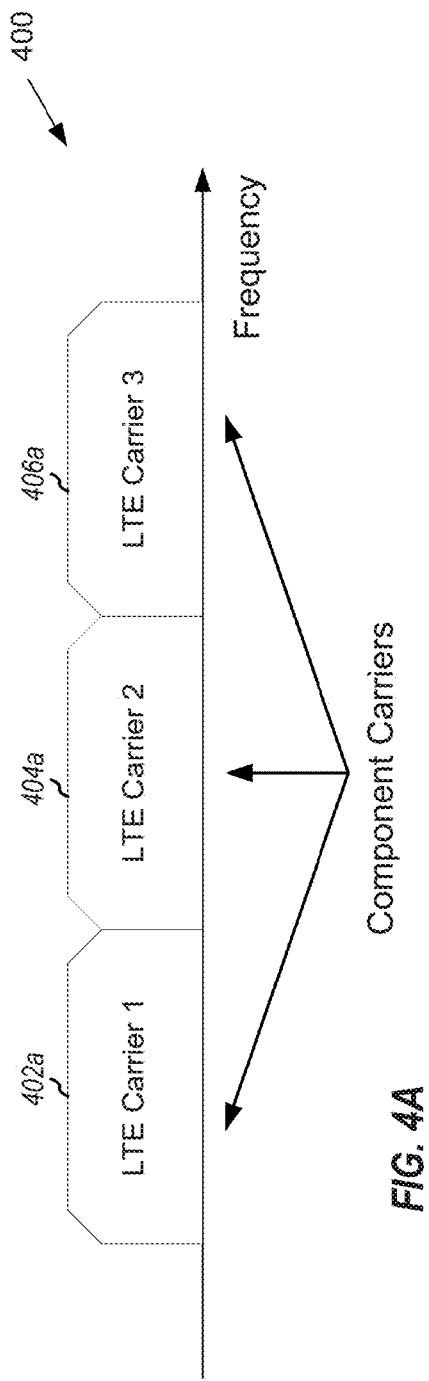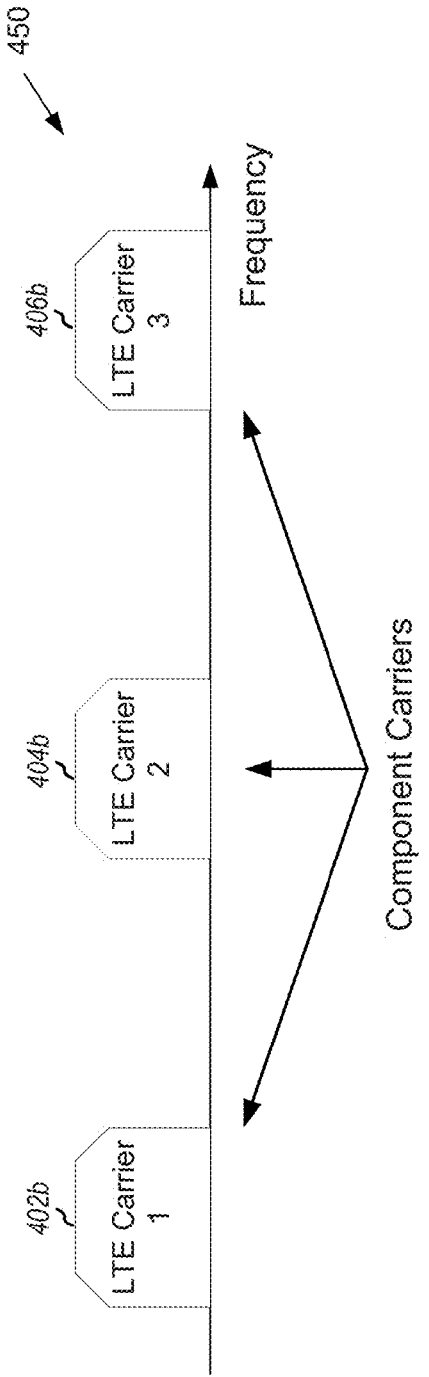
FIG. 4A
FIG. 4B

LTE-U CLEAR CHANNEL ASSESSMENT OPERATIONS

CROSS-REFERENCE TO RELATED APPLICATION

This application claims priority pursuant to 35 U.S.C. §119(e) to U.S. provisional application Ser. No. 61/887,922, filed Oct. 7, 2013, which is hereby incorporated by reference, in its entirety.

FIELD

Aspects of the present disclosure relate generally to wireless communication systems, and more particularly, to methods for transmission using LTE in Unlicensed band ("LTE-U") clear channel assessment (CCA).

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of access point that can support communication for a number of mobile devices, such as, for example, mobile stations (STA), laptops, cell phones, PDAs, tablets, etc. A STA may communicate with an access point via the downlink (DL) and uplink (UL). The DL (or forward link) refers to the communication link from the access point to the STA, and the UL (or reverse link) refers to the communication link from the STA to the access point.

SUMMARY

Methods, apparatus and systems for performing clear channel assessment (CCA) in LTE-U techniques are described in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for performing clear channel assessment (CCA) in LTE-U is provided. The method may include monitoring for transmissions in a resource reserved for CCA, and detecting an energy of the transmissions over a shorter duration than an assigned slot in the resource reserved for CCA. The shorter duration may be based on at least one guard period at the edges of the assigned slot. The method may further include transmitting a beacon in a slot assigned to a wireless entity for CCA in response to detecting a clear channel based on the monitoring. The transmissions may follow a timing mask having an off time period with a first predetermined time offset before an orthogonal frequency division multiplexing (OFDM) symbol boundary, and an on period with a second predetermined time offset after the OFDM symbol boundary. The method may further include adapting a beacon transmission for CCA and a timing for the monitoring in response to detecting the transmissions for a consecutive number of CCA periods. Adapting the beacon transmission may further include transmitting the beacon in an auxiliary resource reserved for CCA. The method may further include biasing timing for detected transmissions to determine blocking by intra-PLMN nodes. In a further aspect, the method may include adjusting to a maximum power for transmission of a beacon in a slot assigned to a mobile station for CCA in response to detecting a clear channel based on the monitoring.

In another aspect, a method for an access point performing timing advance in LTE-U may be provided. The method may include receiving, from at least one mobile station, at least one message comprising timing information from the at least one mobile station, and determining, using the received timing information, at least one timing advance parameter for channel usage beacon signals (CUBS) transmission and an associated clear channel assessment (CCA) window for the at least one mobile station based on reducing a timing difference between the at least mobile station. The receiving may include at least one of receiving a random access preamble or receiving at least one Rx-Tx timing difference report comprising the timing information. The transmit timing of CUBS may be different from the transmit timing of PUSCH. The method may further include transmitting at least two timing advance commands to a same mobile station. The transmit timing of CUBS may be the same as a transmit timing from a PUSCH.

In a further aspect, a method for performing, at an access point, uplink power control for a mobile station that needs to perform CCA in LTE-U may be provided. The method may include determining a target received power for CUBS transmissions based on a CCA power threshold and a power margin based on mobile stations of neighboring access points. The method may further include determining a slope of a transmission power as a function of an estimated path loss for CUBS transmission. The method may also include sending the determined target received power and the determined slope to the mobile station. The power margin may be further based on an antenna gain different plus a path loss difference. The slope may be determined such that CUBS transmissions have a similar power level for mobile stations with small path losses and with large path losses. Further, the slope may be determined such that CUBS transmissions have higher power for mobile stations with smaller path losses.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities or base stations of various types used for wireless communications. Similarly, an article of manufacture may be provided, including a non-transitory computer-readable medium holding encoded instructions, which when executed by a processor, cause a wireless communications apparatus to perform the methods and aspects of the methods as summarized above.

All of the operations of the foregoing methods may be performed by a network entity or entities of a wireless communication system(s), using components as described in more detail elsewhere herein.

BRIEF DESCRIPTION OF THE DRAWINGS

FIG. 4A discloses a contiguous carrier aggregation type.

FIG. 4B discloses a non-contiguous carrier aggregation type.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
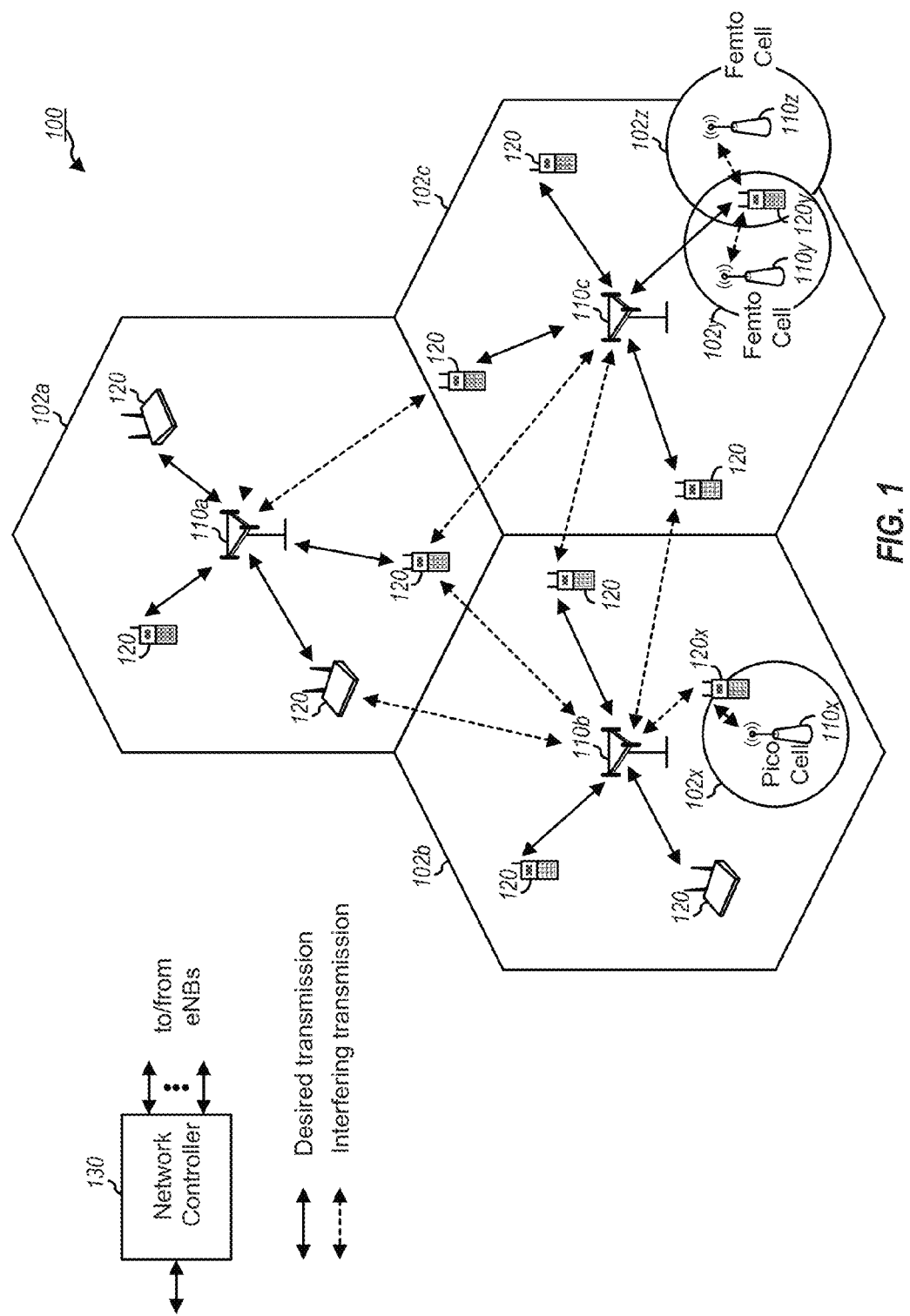
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. Broadcast multicast operations may require synchronization of base stations within a defined area, but the present technology is not limited thereby. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a node, a station, etc. A UE may be a cellular phone, a personal digital assistant (PDA), a wireless modem, a wireless communication device, a handheld device, a laptop computer, a cordless phone, a wireless local loop (WLL) station, or other mobile devices. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
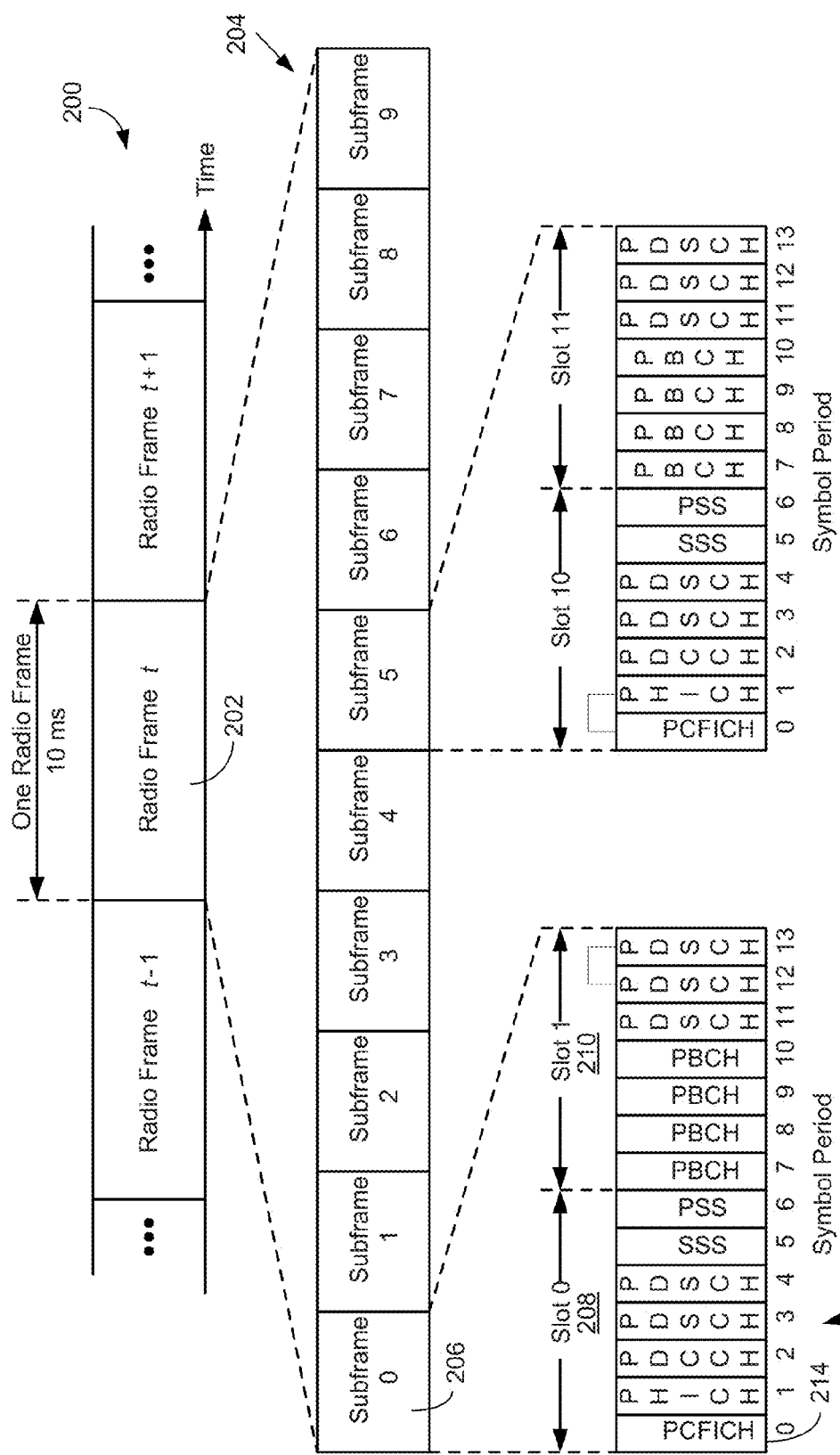
FIG. 2 is a block diagram illustrating an example of a downlink frame structure in a telecommunications system.
Figure 6:
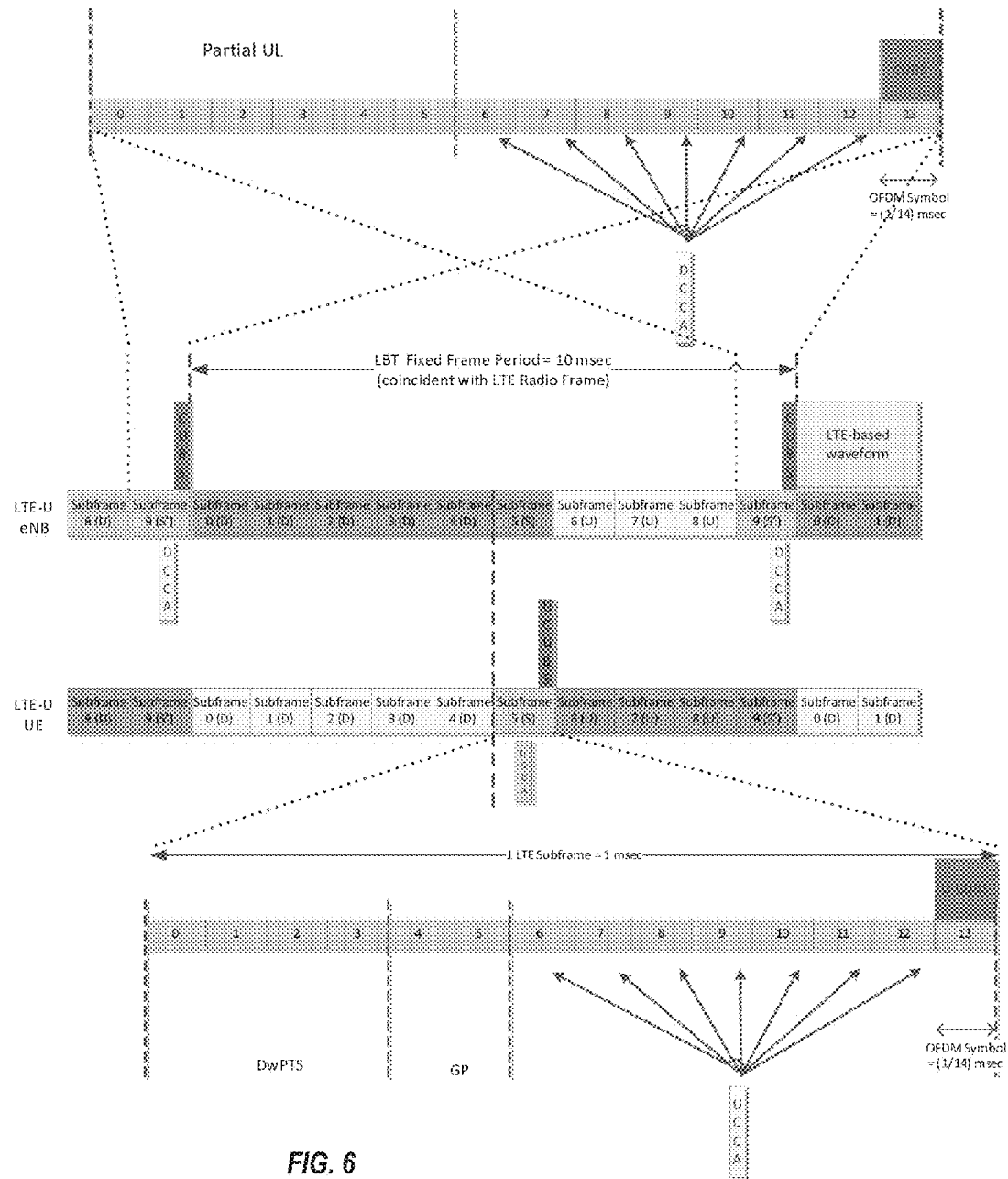
FIG. 6 illustrates CCA placement options in an example time division duplex (TDD) frame structure.

FIG. 2 shows a downlink frame structure used in LTE. The transmission timeline for the downlink may be partitioned into units of radio frames 200. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include 1' symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover 'N' subcarriers (e.g., 12 subcarriers) in one slot.

In LTE, an eNB 110 may send a primary synchronization signal (PSS) and a secondary synchronization signal (SSS) for each cell in the eNB 110. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB 110 may send a Physical Broadcast Channel (PBCH) in symbol periods 0 to 3 in slot 1 of subframe 0. The PBCH may carry certain system information.

The eNB 110 may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB 110 may send a Physical H-ARQ Indicator Channel (PHICH) and a Physical Downlink Control Channel (PDCCH) in the first M symbol periods of each subframe (M=3 in FIG. 2). The PHICH may carry information to support hybrid automatic retransmission (H-ARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB 110 may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB 110 may send the PSS, SSS and PBCH in the center 1.08 MHz of the system bandwidth used by the eNB 110. The eNB 110 may send the PCFICH and PHICH across the entire system bandwidth in each symbol period in which these channels are sent. The eNB 110 may send the PDCCH to groups of UEs in certain portions of the system bandwidth. The eNB 110 may send the PDSCH to specific UEs in specific portions of the system bandwidth. The eNB 110 may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB 110 may send the PDCCH to the UE in any of the combinations that the UE will search.

Figure 3:
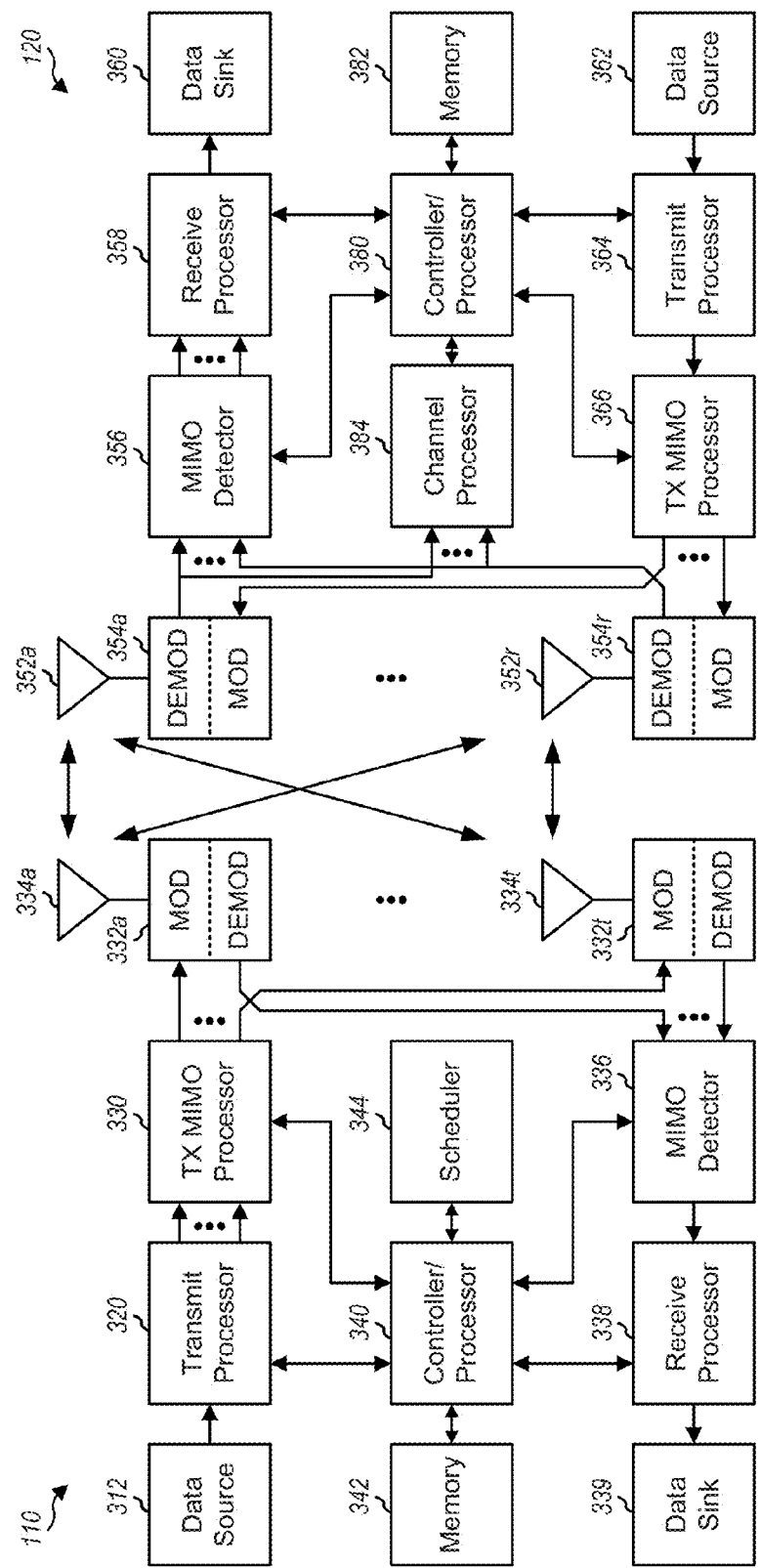
FIG. 3 is a block diagram illustrating a design of a base station/eNB and a UE configured according to one aspect of the present disclosure.

FIG. 3 shows a block diagram of a design of a base station/eNB 110 and a UE 120, which may be one of the base stations/eNBs 110 and one of the UEs 120 in FIG. 1. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive downlink signals from the base station 110 and/or neighboring base stations and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive (RX) processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

If the UE transmits data on the PUSCH without a simultaneous transmission on the PUCCH for a serving cell c, then the UE transmit power $P_{PUSCH,c}(i)$ for PUSCH transmission in subframe i for the serving cell c may be given by:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

[dBm]

For example, $P_{O\_PUSCH,c}$ may be a target received power. $\alpha_c$ may be a slope of the target received power.

Further details and formulas for power control in LTE may be provided in, for example, 3GPP TS 36.213 which is incorporated in its entirety herein.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in the figures below and/or other processes for the techniques described herein. The processor 340 and/or other processors and modules at the eNB 110 may perform or direct the execution of the functional blocks illustrated in the figures below and/or other processes for the techniques described herein. The memories 342 and 382 may store data and program codes for the base station 110 and the UE 120, respectively. A scheduler 344 may schedule UEs for data transmission on the downlink and/or uplink.

As will be readily appreciated, antennas 352, modulators 354, transmit processor 364, and/or TX MIMO processor 366 may form a transmit chain of UE 120 and supply means for sending or transmitting uplink signals under the control of processor 380. For example, the transmit chain may supply means for performing CCA in LTE-U.

As will be readily appreciated, antennas 352, demodulators 354, receive processor 358, and/or RX MIMO detector 356 may form a receive chain of UE 120 and supply means for performing CCA in LTE-U.

In one aspect, processor 380 includes modules for performing operations of the methods described herein, by executing instructions held in the memory 382. Such modules, for example, may include means for determining at least one metric associated with a constraint on a transmissions channel of the unlicensed communication band. Such modules, for example, may be utilized by processor 380 to control operation of the respective transmit and receive chains.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 11, 12, 14, and 16, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication may include means for performing the process illustrated in the figures below. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

FIG. 4A shows an example of contiguous carrier aggregation. To achieve high data rates for LTE, it may be necessary to increase the transmission bandwidth(s) that are supported by using a single carrier or channel. By using carrier aggregation (CA), it is possible to use more than one carrier and increase the overall transmission bandwidth. In an embodiment, K number of component carriers (CCs) may be available and may be adjacent to each other, where in general K may be any integer value. K may be limited to 5 or less in some LTE releases. As shown in FIG. 4A, component carriers 402a, 404a, and 406a are adjacent to each other. Each of the component carriers 402a, 404a, and 406a may have a bandwidth of up to 20 MHz. The overall system bandwidth may be up to 100 MHz when five CCs are supported. FIG. 4B shows an example of non-contiguous carrier aggregation. K number of CCs may be available and may be separate from each other. As shown in FIG. 4B, component carriers 402b, 404b, and 406b are not adjacent or are non-contiguous to each other. Each CC may have a bandwidth of up to 20 MHz. The aggregated carriers may include a primary component carrier (PCC), serving the primary serving cell (PSC or PCell). The primary serving cell may be referred to as the PCell. The aggregated carriers may include a number of secondary component carriers (SCC), each serving a respective secondary serving cell (SSC or SCell).

In accordance with one or more aspects of the disclosure, there are provided methods and apparatuses for LTE-U devices performing clear channel assessment (CCA). In at least one embodiment, LTE operation in an unlicensed band may offer significantly better coverage and higher spectral efficiency in comparison to WiFi, while also enabling a seamless flow of data across licensed and unlicensed in a core network. In an example, from the perspective of a user, LTE-U may provide an enhanced broadband experience, higher data rates, seamless use of both licensed and unlicensed bands, with high reliability and robust mobility through a licensed anchor carrier. However, a consideration for LTE-U is to ensure that LTE-U co-exists with current access technologies such as WiFi on "fair" and "friendly" bases.

LTE may provide several operational modes. For operation in the unlicensed spectrum, LTE may be referred to as LTE-U ("LTE in Unlicensed band") as discussed before. Such unlicensed spectrum may include unlicensed or "license-exempt" radio bands for 802.11 (WiFi), 802.15.1 (Bluetooth) and 802.15.4 (ZigBee) that are used in a 2.4 GHz ISM (Industrial, Scientific and Medical) band and a 5 GHz U-NII (Unlicensed National Information Infrastructure) band. LTE-U may enable data offload initially in an unlicensed band(s) by leveraging LTE carrier aggregation and Supplemental Downlink (SDL) protocols. For example, LTE-U may provide a supplemental downlink (SDL) mode for use by existing licensed spectrum service providers (traditional MNO). The SDL may be used for downlink capacity offload. In another mode, carrier aggregation (CA) may be used by existing licensed spectrum service providers (traditional MNO). The CA mode may be used for downlink and uplink capacity offload. In another mode called stand-alone (SA) mode, no licensed spectrum may be used by a service provider. The SA mode may be used by venue (e.g., a sports stadium) operators or MVNOs. SA mode may be used for in-venue access or for non-traditional wireless access, or in an enterprise setting.

Carrier aggregation CA mode may include a design based on CA using either or both the licensed spectrum and the unlicensed spectrum. In one design, the licensed spectrum may be used as an anchor or primary component carrier (PCC). Control and critical data may be transported on the licensed spectrum. The unlicensed spectrum may be used for data offload providing data-only transmissions. In the downlink and uplink, LTE on the licensed channel may provide both control and data. LTE on the unlicensed channel may provide data.

For operation in the unlicensed spectrum, devices may be configured for listen-before-talk (LBT). In this configuration, the downlink transmitter at the eNB may perform CCA every 10 millisecond (ms). However, it is appreciated that other time periods for performing CCA may be used and still be within the scope of the subject technology. In one aspect, LBT may be based on a fixed frame period. The CCA may provide a mechanism for the transmitter the grab-and-relinquish the resources with the CCA aligned to a radio frame boundary. In one example, LBT may not be provided at the UE because LBT may only be required at the transmitter.

Figure 5:
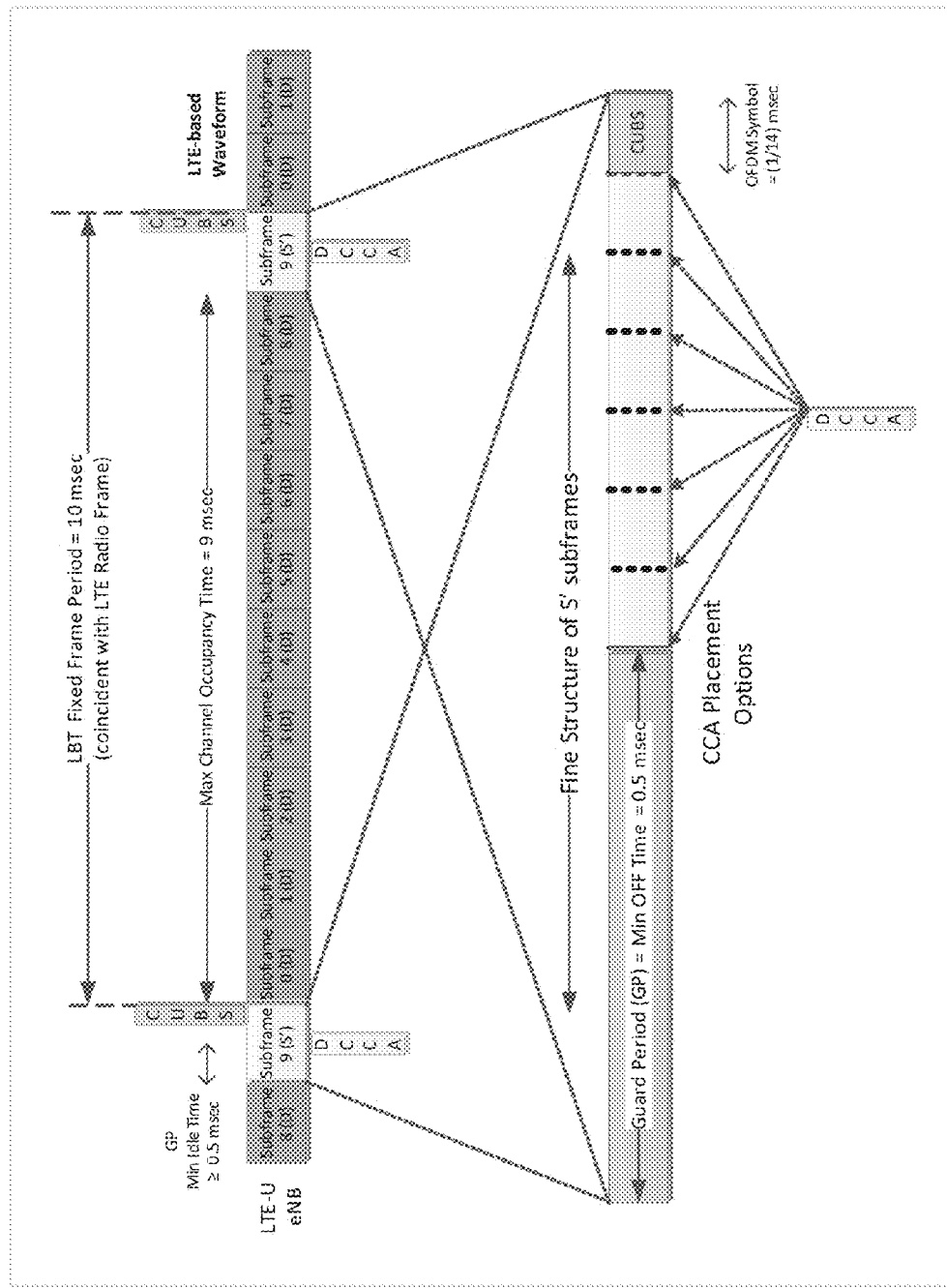
FIG. 5 illustrates example clear channel assessment (CCA) placement options in a downlink subframe structure.

FIG. 5 illustrates example CCA placement options in a downlink (DL) frame structure. For example, LBT in the downlink may be achieved through a partial uplink (S') subframe to schedule succeeding downlink subframes. For example, CCA in the S' subframe may be used for a node to reserve or hold the upcoming transmission resources. In the example of FIG. 5, the opportunities for CCA occur at subframe 9. The number of slots for CCA placement may be referred to as a CCA reuse factor, which may be 7 in FIG. 5. In subframe 9, a guard period (GP) may be provided prior to the CCA placement opportunities. For example, a minimum idle time may be greater than or equal to 0.5 ms. A cell-specific (or common) reference signal (CRS) may be provided every $5^{th}$ subframe. The waveform used for transmission of the subframes may be based on a UE reference signal (UEFS) based demodulation.

LBT frames may coincide with the 10 ms radio frames. One LBT frame may include 9 downlink (DL) subframes followed by one S' subframe. The DL subframes may be used for data transmission (e.g., 9 ms per radio frame). The S' subframe may be used for discontinuous transmission (DTX), CCA, or channel usage beacon signals (CUBS).

CCA may succeed if a receive power, detected at a node, during CCA stays below a specified threshold. If CCA succeeds at a node then the node may "grab-and-hold" the medium, until the start of the next S' subframe. The node may transmit CUBS for the remaining symbols of the S' subframe. CUBS may ensure that other nodes performing CCA later in the S' subframe sense that the medium is occupied. In this regard, the transmission of CUBS may effectively block the transmission signals of other UEs that are nearby. The node may then transmit data from the next (e.g., 0th) subframe onwards until needed (for up to 9 subframes).

In an embodiment, all nodes within the same public land mobile network (PLMN) perform CCA at the same time. None of the nodes block each other as a result of synchronized CCA. This may promote full spatial re-use within a deployment. In an embodiment, by default, nodes from different deployments are configured to perform CCA at different points in time. CCA occasions may be permuted in time for fairness across deployments. Cooperating deployments may decide to perform CCA at same time.

FIG. 6 illustrates CCA placement options in an example time division duplex (TDD) frame structure. Subframe S' (e.g., subframe 9) may be used to hold the succeeding DL subframes (e.g., subframes 0-4) by providing DL CCA placement options. For example, subframe S' (e.g., subframe 9) may include partial UL, DL CCA (downlink clear channel assessment), and DL CUBS (downlink channel usage beacon signals). Subframe S (e.g., subframe 5) may be used to hold the succeeding UL subframes (e.g., subframes 6-8). For example, subframe S (e.g., subframe 5) may include downlink pilot time slot (DwPTS), GP, UL CCA, and UL CUBS.

Figure 7:
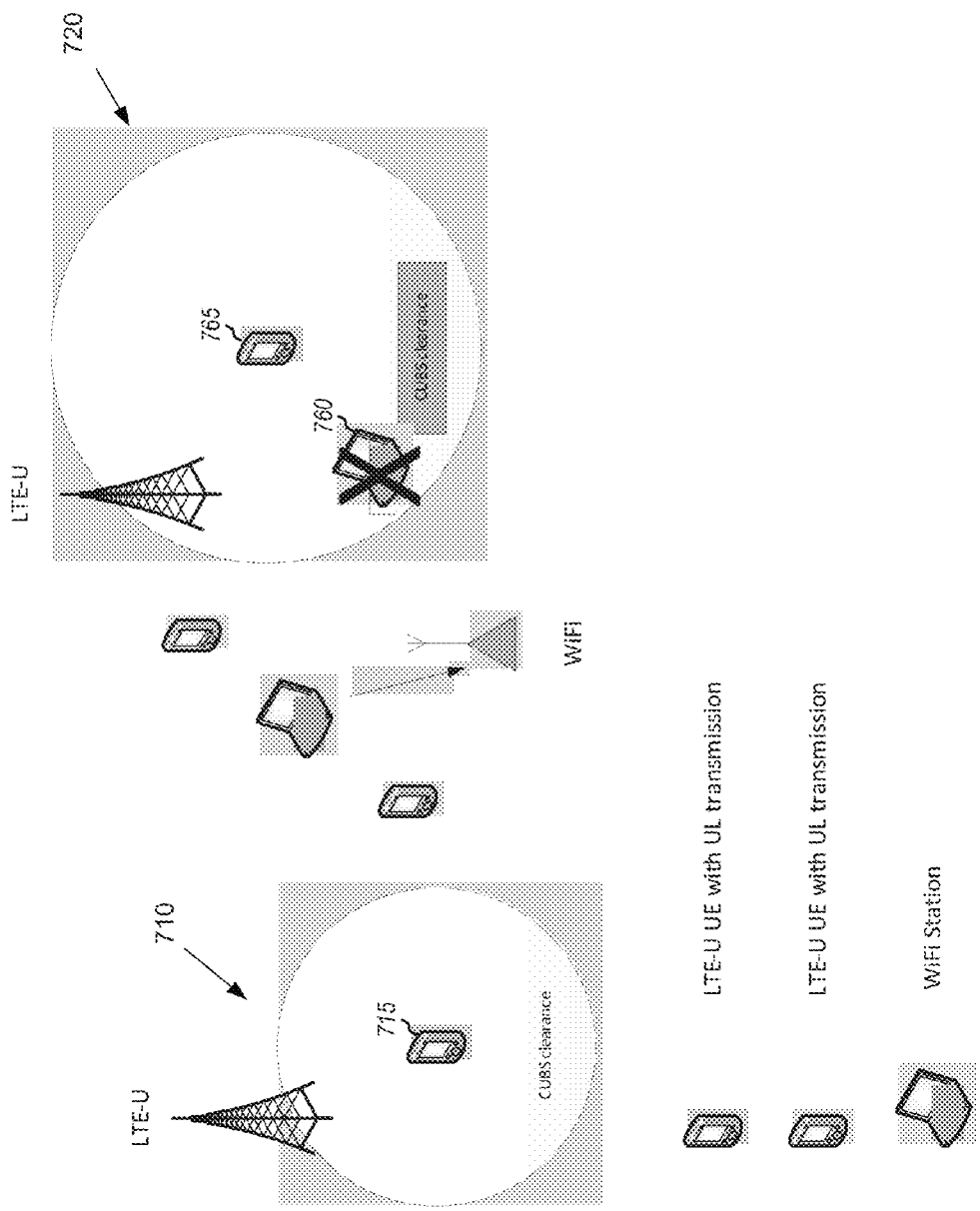
FIG. 7 illustrates CCA in an example wireless communication system.

FIG. 7 illustrates CCA in an example wireless communication system. Only UEs with pending opportunistic transmissions may perform CCA in the S subframe. If CCA succeeds, the UE may transmit UL-CUBS (uplink channel usage beacon signals) to clear the channel. This method may only block others when necessary. UL CCA (uplink clear channel assessment) could be made independent of DL CCA clearance (the range of the CCA transmission). Different LTE-U PLMNs may take UL based on assignments from the PCC.

In the example of FIG. 7, the devices may block other devices in LTE-U systems 710 and 720. The clearance of a mobile device 715 in LTE-U system 710 may be sufficiently small to avoid blocking other devices. The clearance of a mobile device 765 in LTE-U system 720, however, may block mobile device 760 connected to the Wi-Fi access point.

In one design for CCA, nodes from the same operator may perform CCA at the same time. CCA sensitivity to time alignment errors may affect the performance of CCA. If there is a timing error of 'X', and the CCA interval is 'Y', a fraction of X/Y TX power may leak into the RX chain. The TX power may come from TX on previous non-CCA symbol or TX on next CCA symbol. The severity of the problem may vary. For a CCA slot of 20 microseconds (μs), the DL CCA may be on the order of 3 μs to meet TDD eNB timing requirements. Assuming RX timing is on the same order, the RX CCA may be 3 μs. Potential leakage may be have a worst case of misalignment on both sides of the symbol (3+3) over the 20 μs slot for 6/20 or 5 dB leakage with an average of 3/20 or 11 dB leakage. The TX/RX switching time may be +/−18 μs.

An over the air (OTA) issue may arise in CCA operations. For a 500 meter cell size, an additional 1.5 μs timing difference may need to be accounted for. DL OTA based synchronization may introduce timing offset among different stratums. OTA delay may be reflected in the higher stratum eNB timing. UL CCA may arise in CCA operations. Timing advance for different UEs may further push apart the CCA time. This may be acceptable for RX of UEs close to the base station. The RX timing from other UEs may be well-adjusted. This may not be as acceptable for RX of UEs far from the base station. The RX timing from the cell center UEs may be further delayed compared to close-by UEs.

Timing and synchronization may be adjusted to address the issues related to CCA. In one embodiment, CCA may be positioned in the middle of an OFDM symbol, e.g., providing a guard period of 23 μs on each side of the symbol. In one aspect, an on-off timing mask may be used for CUBS. The timing mask may move the transient period into the defined OFDM symbol duration. For example, instead of having the transient period as [T−20, T], the period may be redefined as [T−10, T+10]. This may provide sufficient margin for timing uncertainty.

In another embodiment, UE timing advance may be adjusted. Enhanced Cell ID, E-CellID, or ECID is a positioning technique that may allow an eNB to gather OTA timing information from UEs. The UE timing adjustment may be made based on ECID information. The timing advance may be adjusted to reduce the timing difference between UEs. A zero timing adjustment may be made to follow the DL which may be acceptable for small cells. In another aspect, timing advance or ECID techniques may be available at the UE. For example, the UE may optimize timing advance parameters and variables.

eNB OTA based synchronization may allow higher tier nodes to bias timing to account for OTA delay.

Figure 8:
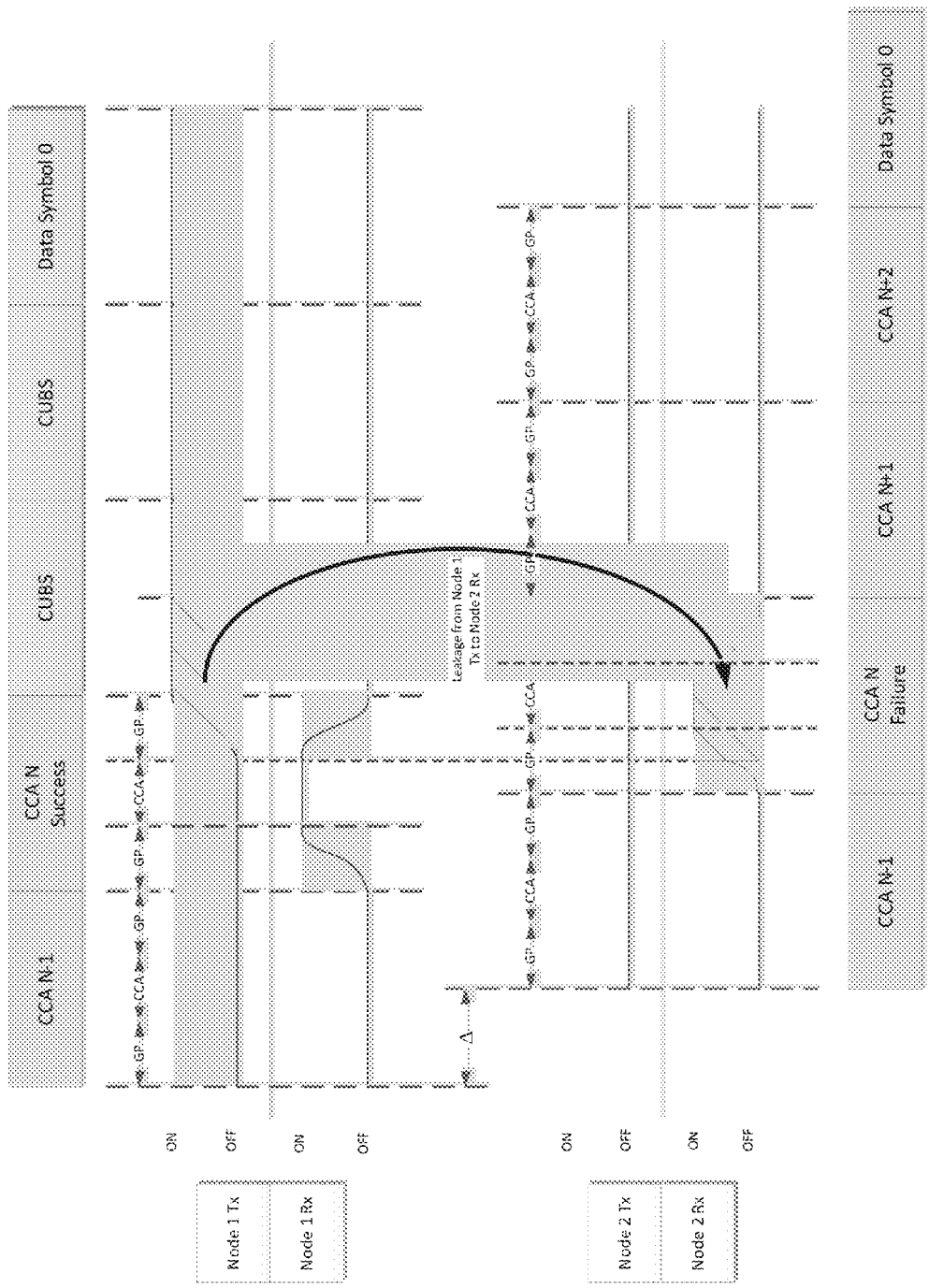
FIG. 8 illustrates CCA for two nodes having a timing offset.

FIG. 8 illustrates CCA for two nodes having a timing offset. In the example of FIG. 8, two nodes Node 1 and Node 2 may have the same CCA slot (e.g., the two nodes are part of the same PLMN). The two nodes may have a timing offset, e.g., delta illustrated in FIG. 8. Node 1 may succeed in CCA, but the TX power from Node 1 may leak into Node 2 RX due to the timing offset. For example, the transmission from Node 1 intended for the CUBS transmission time interval (TTI) may leak into the CCA N TTI of Node 2 due to the timing offset between the two nodes.

Figure 9:
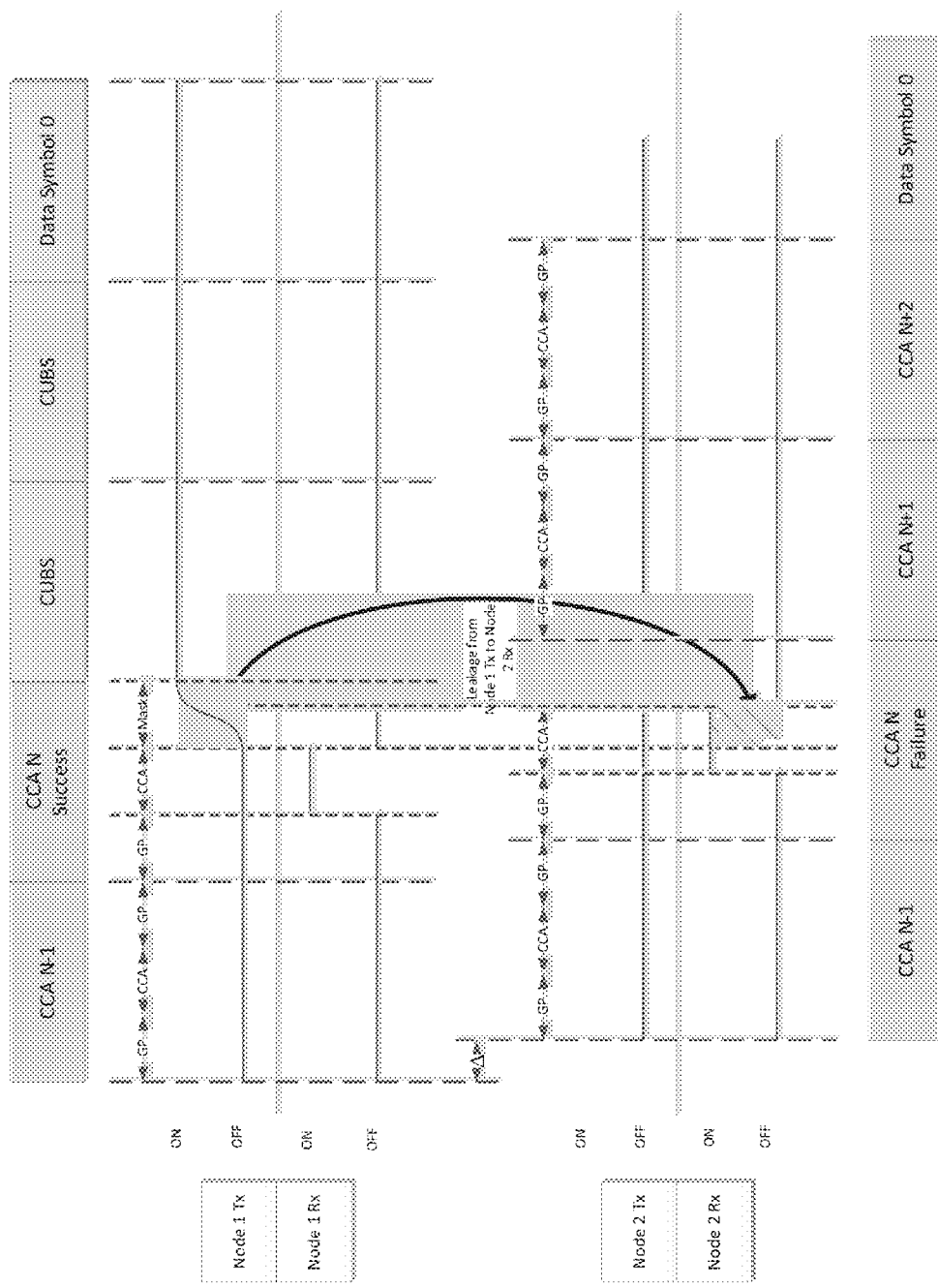
FIG. 9 illustrates CCA for two nodes having another timing offset.

FIG. 9 illustrates CCA for two nodes having another timing offset. The timing offset in FIG. 9 may be a smaller timing offset than illustrated in the example of FIG. 8. In the example of FIG. 9, two nodes Node 1 and Node 2 may have the same CCA slot (e.g., the two nodes are part of the same PLMN). The two nodes may have a timing offset, e.g., delta illustrated in FIG. 9. Node 1 may succeed in CCA, but the TX power from Node 1 may leak into Node 2 RX due to the timing offset. For example, the transmission from Node 1 intended for the CUBS TTI may leak into the CCA N TTI of Node 2 due to the timing offset between the two nodes.

Figure 10:
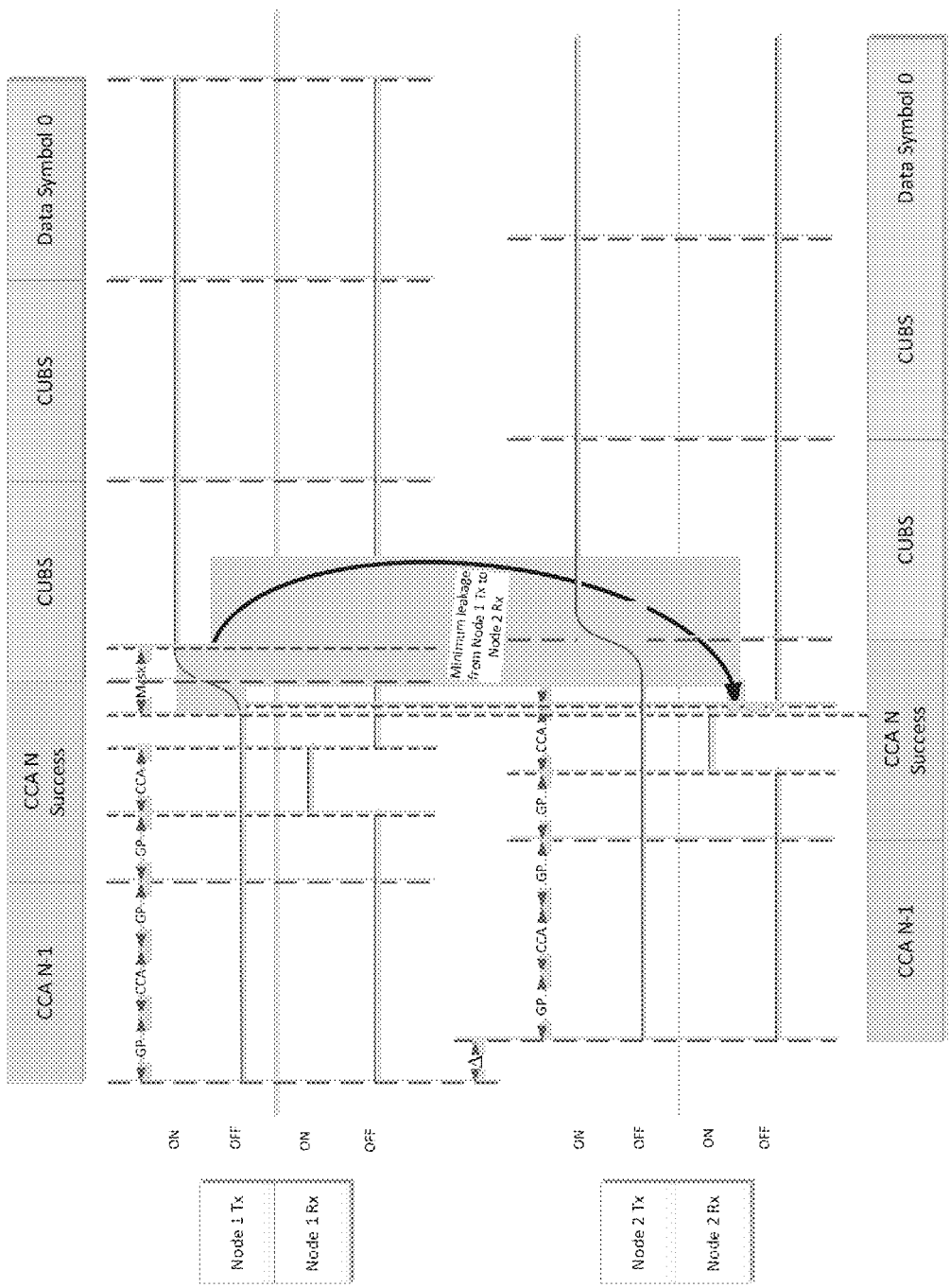
FIG. 10 illustrates a shifted timing mask.

FIG. 10 illustrates a shifted timing mask. In the example of FIG. 10, two nodes Node 1 and Node 2 may have the same CCA slot (e.g., the two nodes are part of the same PLMN). The two nodes may have a timing offset, e.g., delta illustrated in FIG. 10. Node 1 may succeed in CCA. The transmission for CUBS may be based on a timing mask. For example, the timing mask may include on and off periods. The off period may be predetermined time period (e.g., a few milliseconds) before the OFDM symbol boundary. The on period may be predetermined time period (e.g., a few milliseconds) after the OFDM symbol boundary. Using the timing mask may reduce interference.

In one embodiment, the waveform may be modified, such as increasing the size of a CCA slot to reduce sensitivity.

In another embodiment, an adaptive algorithm may be used when a node is constantly blocked in CCA. For example, the node may detect blocking and bias timing. The node may reduce TX power on CUBS in case of blocking. The node may move to an auxiliary CCA slot for nodes blocked by intra-PLMN transmissions. When the node is no longer blocked by intra-PLMN transmissions, then the node may move back to the assigned CCA slot.

UL CUBS open loop power inversion may be used at each node based on current LTE specifications using power spectral density (PSD) control. Open loop power control may result in less silencing of other UEs when a UE is close to the eNB. The power control may result in more silencing to other UEs when a UE is far away from the eNB. A P0 may be used to achieve same target RSSI at the eNB based on total power. The Target may be a CCA threshold of e.g., −62 dBm, plus a margin. The margin may be predicted based on a coupling loss difference between the serving cell eNB and UEs from another PLMN. The margin may be an antenna gain difference plus a path loss difference (e.g., shadowing+distance). The power control may be beneficial for SRS/CUBS reception at the eNB. The power control may be beneficial for inter-cell interference management to facilitate reuse 1. The power control, however, may be inadequate in silencing Wi-Fi and other LTE-U nodes. In addition, UEs further away from the eNB may create a larger reuse factor.

In another embodiment, the UL CUBS may be based on a maximum power. This may be beneficial for silencing other PLMN/RAT UEs, and match the DL CUBS. The maximum power, however, may be difficult for a reuse of 1 due to inter-cell interference. eNB interference cancellation may be used to address this issue. Intra-cell RX signal dynamic range may be high for this approach.

Figure 11:
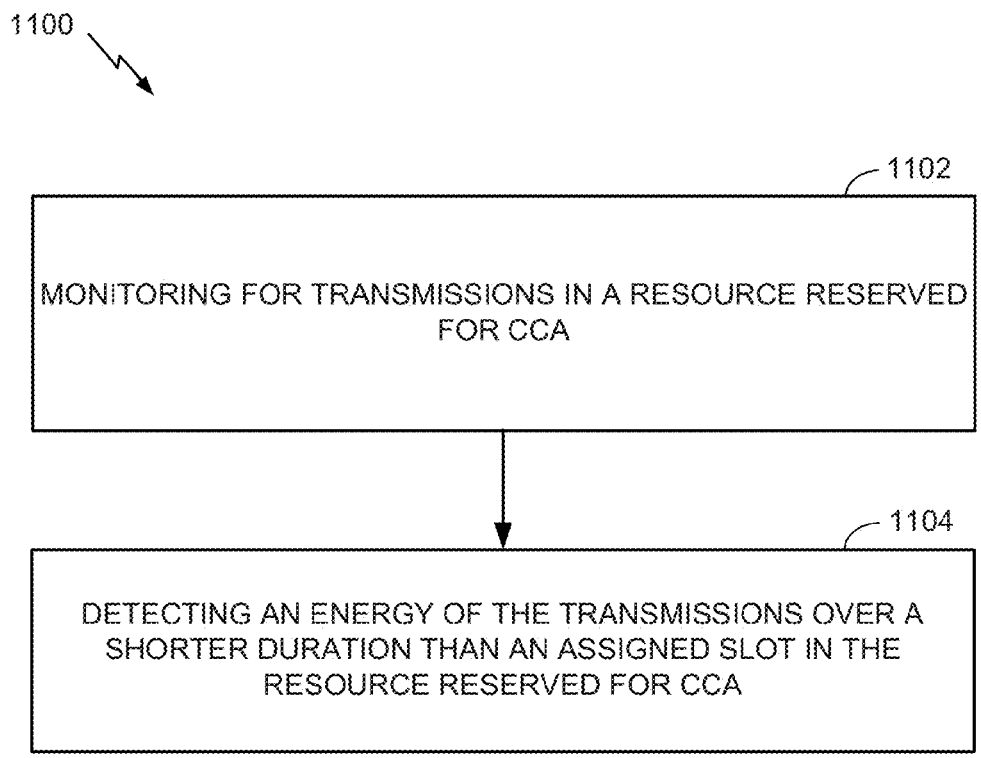
FIG. 11 illustrates an embodiment of methodologies for CCA in LTE-U.

FIG. 11 illustrates embodiments of methodologies for CCA in LTE-U. The method may be performed by a wireless entity such as a UE, mobile entity, eNB, femto access point, or the like. The method 1100 may include, at 1102, monitoring for transmissions in a resource reserved for CCA. The method may include, at 1104, detecting an energy of the transmissions over a shorter duration than an assigned slot in the resource reserved for CCA.

Figure 12:
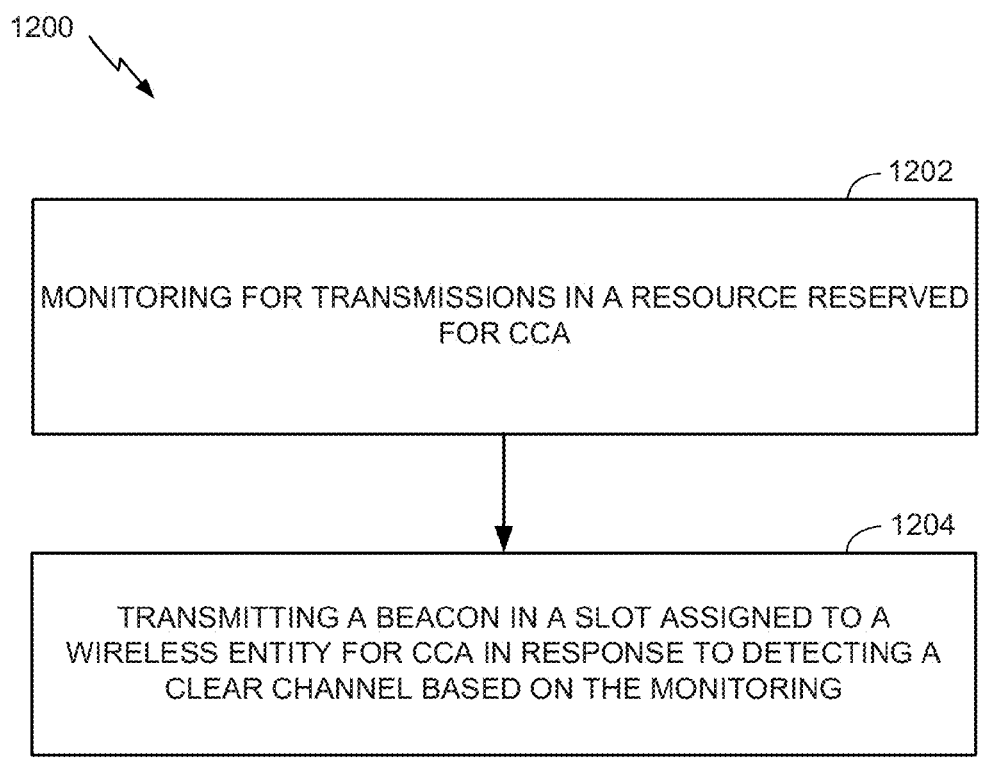
FIG. 12 illustrates another embodiment of methodologies for CCA in LTE-U.
Figure 13:
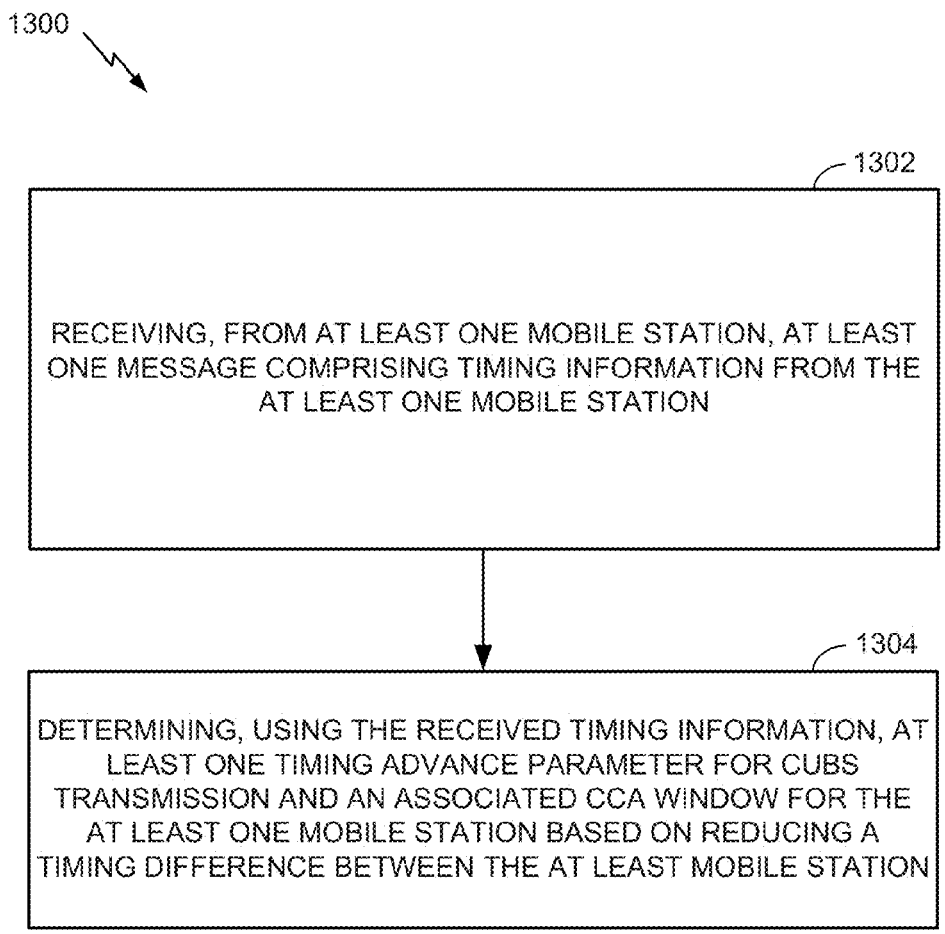
FIG. 13 illustrates embodiment of methodologies for timing advance in LTE-U.

FIG. 12 illustrates other embodiments of methodologies for CCA in LTE-U. The method may be performed by a wireless entity such as a UE, mobile entity, eNB, femto access point, or the like. The method 1200 may include, at 1202, monitoring for transmissions in a resource reserved for CCA. The method may include, at 1204, transmitting a beacon in a slot assigned to a wireless entity for CCA in response to detecting a clear channel based on the monitoring. For example, the transmissions may follow a timing mask having an off time period with a first predetermined time offset before an OFDM symbol boundary, and an on period with a second predetermined time offset after the OFDM symbol boundary FIG. 13 illustrates embodiments of methodologies for timing advance in LTE-U. The method may be performed by an eNB, femto access point, or the like. The method 1300 may include, at 1302, receiving, from at least one mobile station, at least one message comprising timing information from the at least one mobile station. The method may include, at 1304, determining, using the received timing information, at least one timing advance parameter for CUBS transmission and an associated CCA window for the at least one mobile station based on reducing a timing difference between the at least mobile station.

Figure 14:
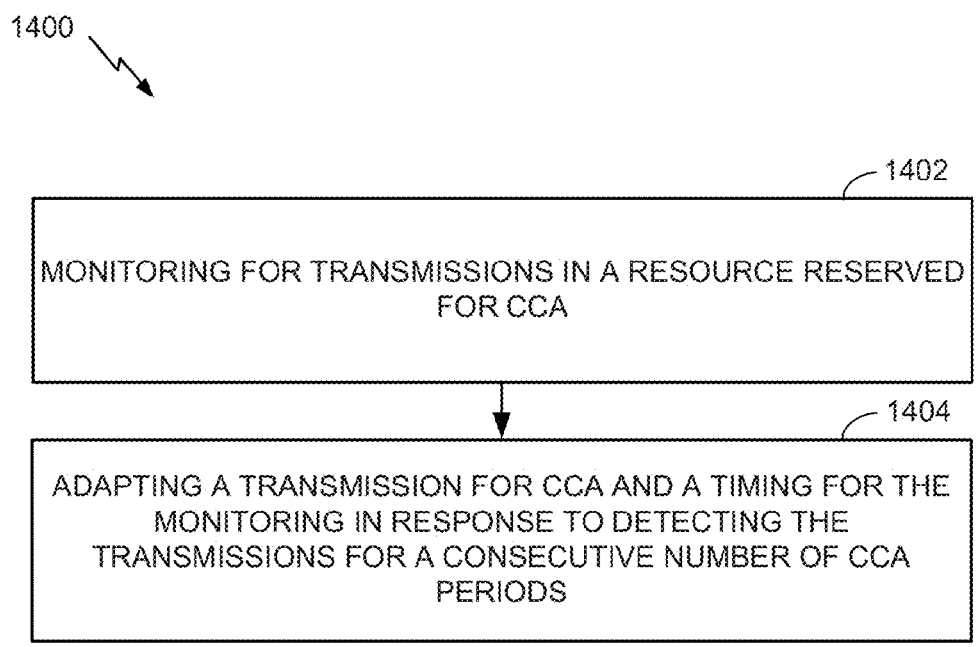
FIG. 14 illustrates yet another embodiment of methodologies for CCA in LTE-U.

FIG. 14 illustrates other embodiments of methodologies for CCA in LTE-U. The method may be performed by a wireless entity such as a UE, mobile entity, eNB, femto access point, or the like. The method 1400 may include, at 1402, monitoring for transmissions in a resource reserved for CCA. The method may include, at 1404, adapting a transmission for CCA and a timing for the monitoring in response to detecting the transmissions for a consecutive number of CCA periods.

Figure 15:
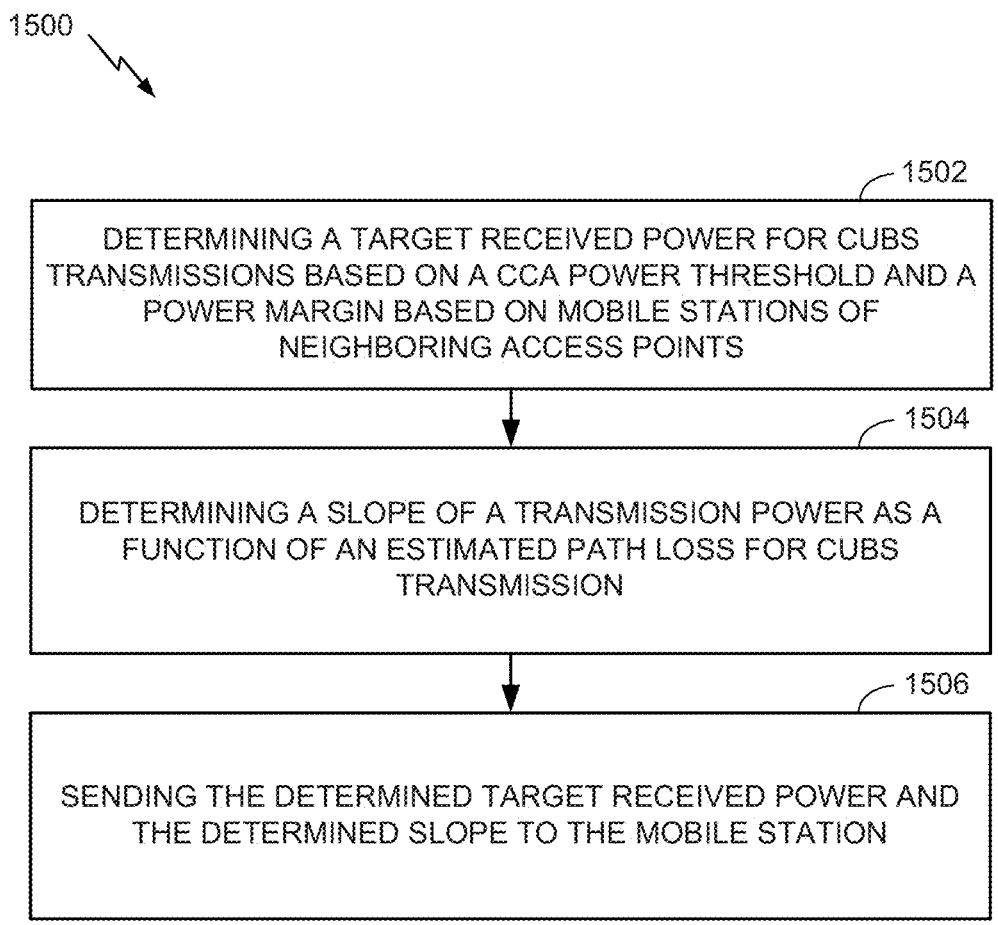
FIG. 15 illustrates yet another embodiment of methodologies for CCA in LTE-U.

FIG. 15 illustrates other embodiments of methodologies for CCA in LTE-U. The method may be performed by an eNB, femto access point, or the like. The method 1500 may include, at 1502, determining a target received power for CUBS transmissions based on a CCA power threshold and a power margin based on mobile stations of neighboring access points. The method may include, at 1504, determining a slope of a transmission power as a function of an estimated path loss for CUBS transmission. The method may include, at 1506, sending the determined target received power and the determined slope to the mobile station.

Figure 16:
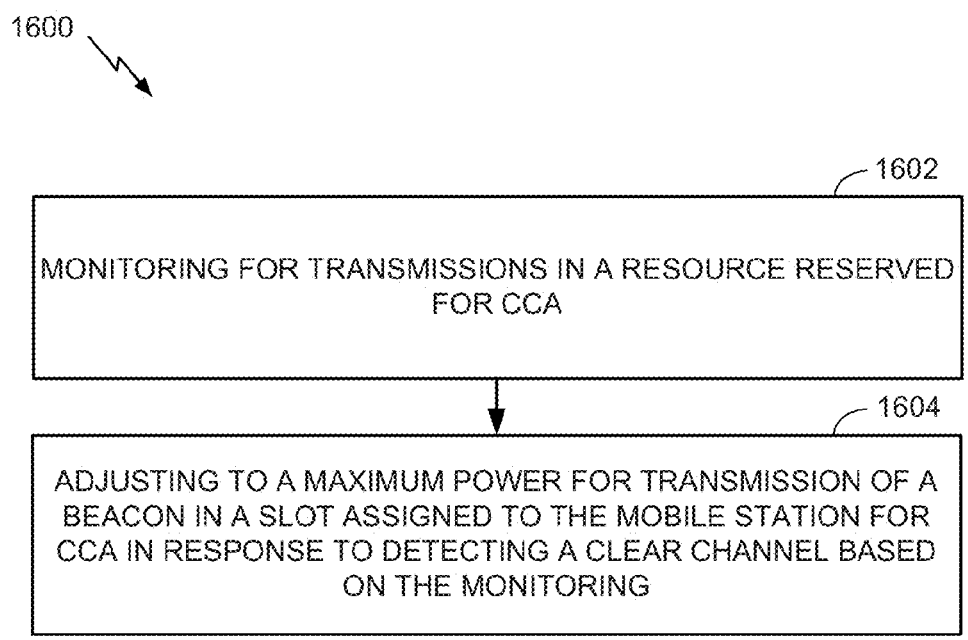
FIG. 16 illustrates yet another embodiment of methodologies for CCA in LTE-U.

FIG. 16 illustrates other embodiments of methodologies for CCA in LTE-U. The method may be performed by a wireless entity such as a UE, mobile entity, or the like. The method 1600 may include, at 1602, monitoring for transmissions in a resource reserved for CCA. The method may include, at 1604, adjusting to a maximum power for transmission of a beacon in a slot assigned to the mobile station for CCA in response to detecting a clear channel based on the monitoring.

Figure 17:
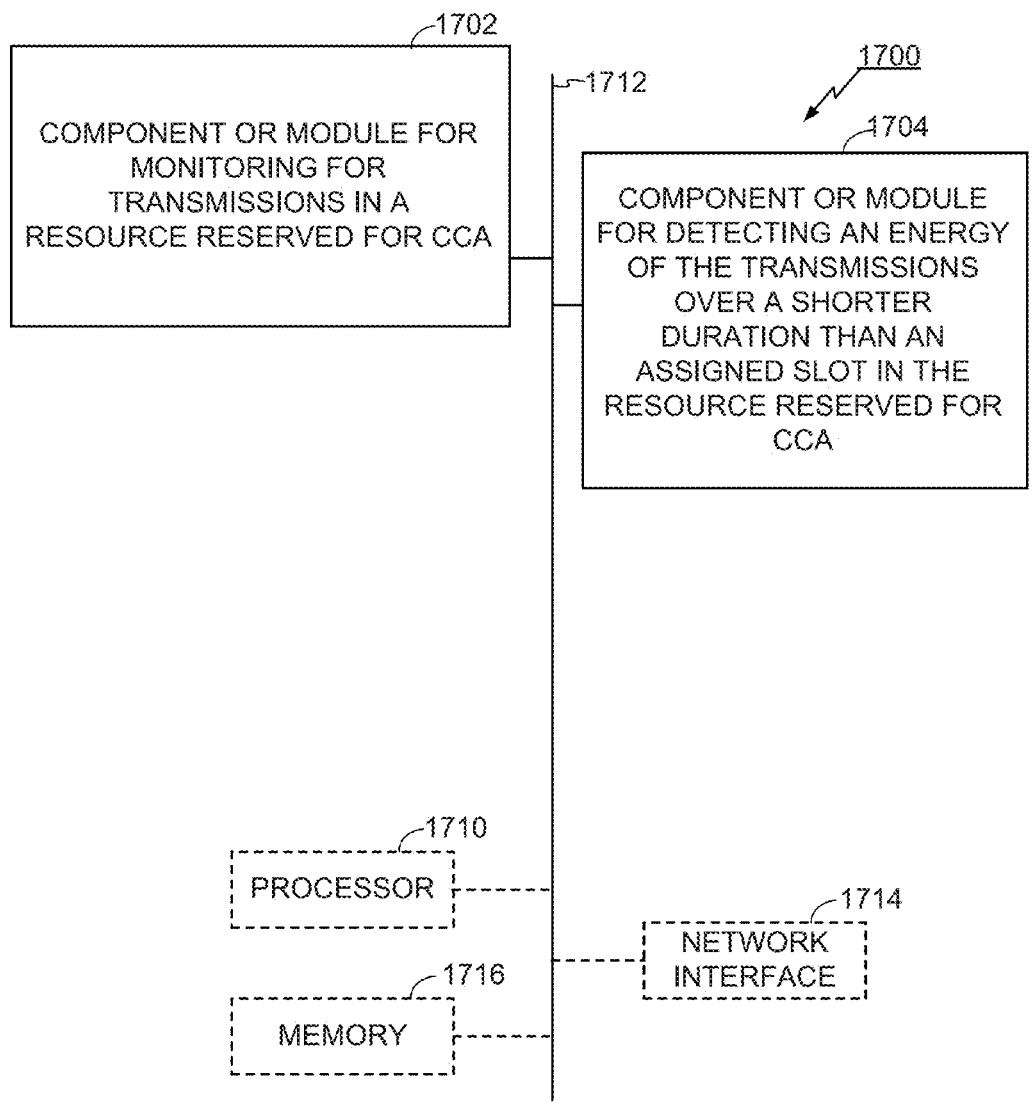
FIG. 17 illustrates an example apparatus for implementing the methodology of FIG. 11.

With reference to FIG. 17, there is provided an exemplary apparatus 1700 that may be configured as a wireless entity such as a UE, mobile entity, eNB, femto access point, or other suitable entity, or as a processor, component or similar device for use within the UE, mobile entity, eNB, femto access point, or other suitable entity, for CCA. The apparatus 1700 may include functional blocks that can represent functions implemented by a processor, software, or combination thereof (e.g., firmware).

As illustrated, in one embodiment, the apparatus 1700 may include an electrical component or module 1702 for monitoring for transmissions in a resource reserved for CCA. The apparatus 1700 may include an electrical component or module 1704 for detecting an energy of the transmissions over a shorter duration than an assigned slot in the resource reserved for CCA.

In related aspects, the apparatus 1700 may optionally include a processor component 1700 having at least one processor, in the case of the apparatus 1700 configured as a network entity. The processor 1700, in such case, may be in operative communication with the components 1702-1704 or similar components via a bus 1712 or similar communication coupling. The processor 1710 may effect initiation and scheduling of the processes or functions performed by electrical components or modules 1702-1704.

In further related aspects, the apparatus 1700 may include a network interface component 1714 for communicating with other network entities. The apparatus 1700 may optionally include a component for storing information, such as, for example, a memory device/component 1716. The computer readable medium or the memory component 1716 may be operatively coupled to the other components of the apparatus 1700 via the bus 1712 or the like. The memory component 1716 may be adapted to store computer readable instructions and data for performing the activity of the components 1702-1704, and subcomponents thereof, or the processor 1710. The memory component 1716 may retain instructions for executing functions associated with the components 1702-1704. While shown as being external to the memory 1716, it is to be understood that the components 1702-1704 can exist within the memory 1716.

Figure 18:
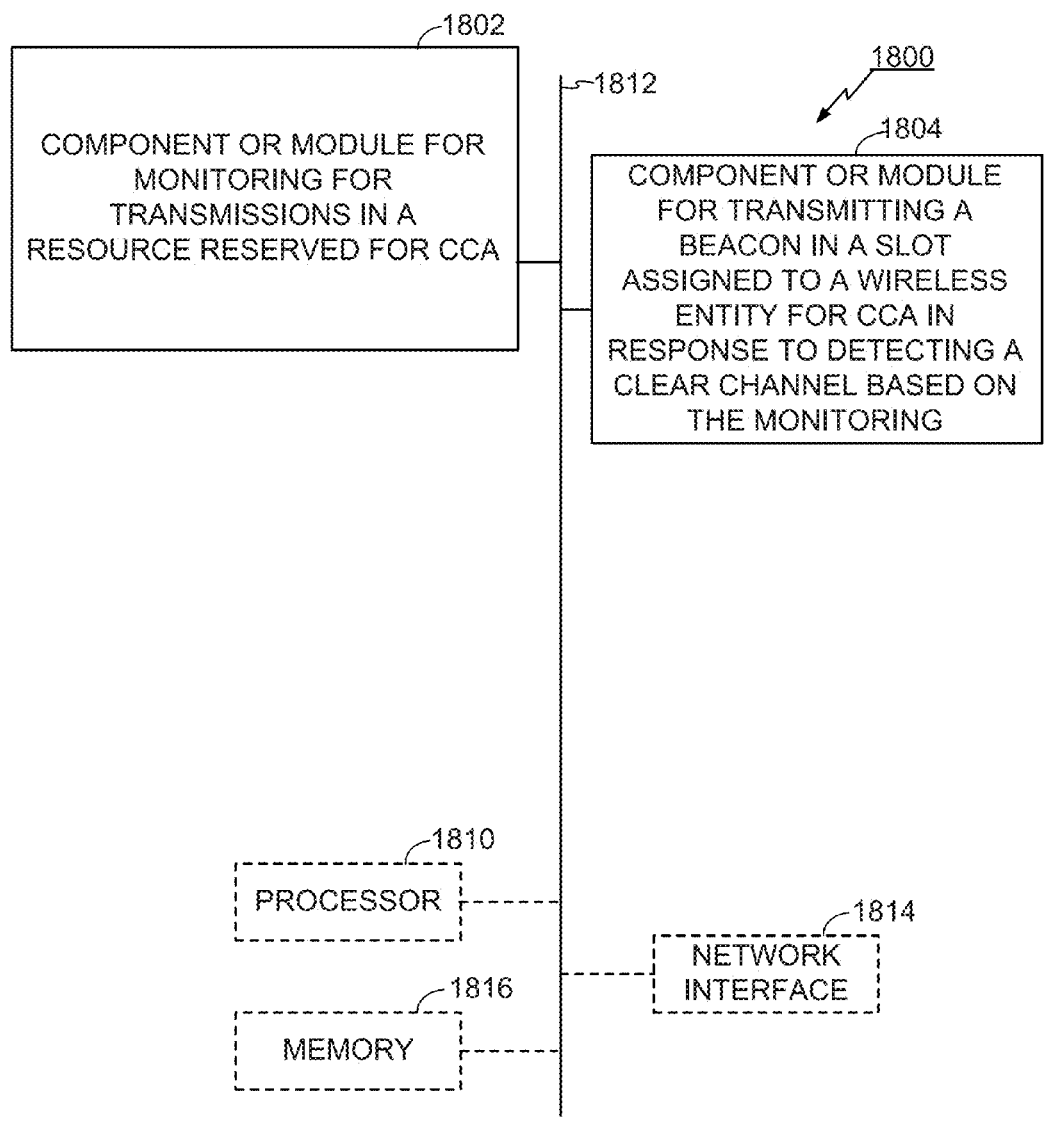
FIG. 18 illustrates an example apparatus for implementing the methodology of FIG. 12.

With reference to FIG. 18, there is provided an exemplary apparatus 1800 that may be configured as a wireless entity such as a UE, mobile entity, eNB, femto access point, or other suitable entity, or as a processor, component or similar device for use within the UE, mobile entity, eNB, femto access point, or other suitable entity, for CCA. The apparatus

1800 may include functional blocks that can represent functions implemented by a processor, software, or combination thereof (e.g., firmware).

As illustrated, in one embodiment, the apparatus 1800 may include an electrical component or module 1802 for monitoring for transmissions in a resource reserved for CCA. The apparatus 1800 may include an electrical component or module 1804 for transmitting a beacon in a slot assigned to a wireless entity for CCA in response to detecting a clear channel based on the monitoring.

In related aspects, the apparatus 1800 may optionally include a processor component 1800 having at least one processor, in the case of the apparatus 1800 configured as a network entity. The processor 1800, in such case, may be in operative communication with the components 1802-1804 or similar components via a bus 1812 or similar communication coupling. The processor 1810 may effect initiation and scheduling of the processes or functions performed by electrical components or modules 1802-1804.

In further related aspects, the apparatus 1800 may include a network interface component 1814 for communicating with other network entities. The apparatus 1800 may optionally include a component for storing information, such as, for example, a memory device/component 1816. The computer readable medium or the memory component 1816 may be operatively coupled to the other components of the apparatus 1800 via the bus 1812 or the like. The memory component 1816 may be adapted to store computer readable instructions and data for performing the activity of the components 1802-1804, and subcomponents thereof, or the processor 1810. The memory component 1816 may retain instructions for executing functions associated with the components 1802-1804. While shown as being external to the memory 1816, it is to be understood that the components 1802-1804 can exist within the memory 1816.

Figure 19:
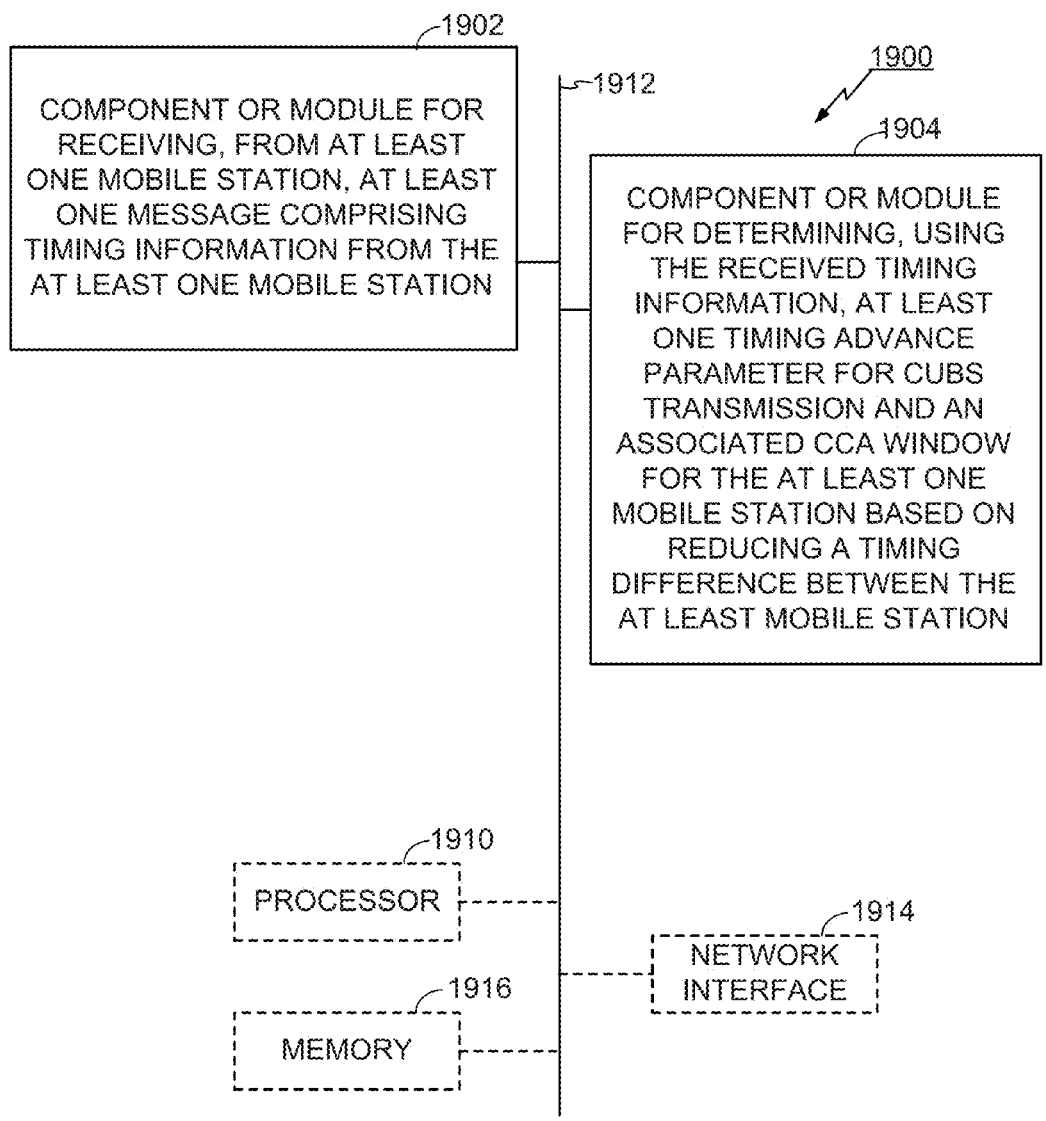
FIG. 19 illustrates an example apparatus for implementing the methodology of FIG. 13.

With reference to FIG. 19, there is provided an exemplary apparatus 1900 that may be configured as an eNB, femto access point, or other suitable entity, or as a processor, component or similar device for use within the eNB, femto access point, or other suitable entity, for CCA. The apparatus 1900 may include functional blocks that can represent functions implemented by a processor, software, or combination thereof (e.g., firmware).

As illustrated, in one embodiment, the apparatus 1900 may include an electrical component or module 1902 for receiving, from at least one mobile station, at least one message comprising timing information from the at least one mobile station. The apparatus 1900 may include an electrical component or module 1904 for determining, using the received timing information, at least one timing advance parameter for CUBS transmission and an associated CCA window for the at least one mobile station based on reducing a timing difference between the at least mobile station.

In related aspects, the apparatus 1900 may optionally include a processor component 1900 having at least one processor, in the case of the apparatus 1900 configured as a network entity. The processor 1900, in such case, may be in operative communication with the components 1902-1904 or similar components via a bus 1912 or similar communication coupling. The processor 1910 may effect initiation and scheduling of the processes or functions performed by electrical components or modules 1902-1904.

In further related aspects, the apparatus 1900 may include a network interface component 1914 for communicating with other network entities. The apparatus 1900 may optionally include a component for storing information, such as, for example, a memory device/component 1916. The computer readable medium or the memory component 1916 may be operatively coupled to the other components of the apparatus 1900 via the bus 1912 or the like. The memory component 1916 may be adapted to store computer readable instructions and data for performing the activity of the components 1902-1904, and subcomponents thereof, or the processor 1910. The memory component 1916 may retain instructions for executing functions associated with the components 1902-1904. While shown as being external to the memory 1916, it is to be understood that the components 1902-1904 can exist within the memory 1916.

Figure 20:
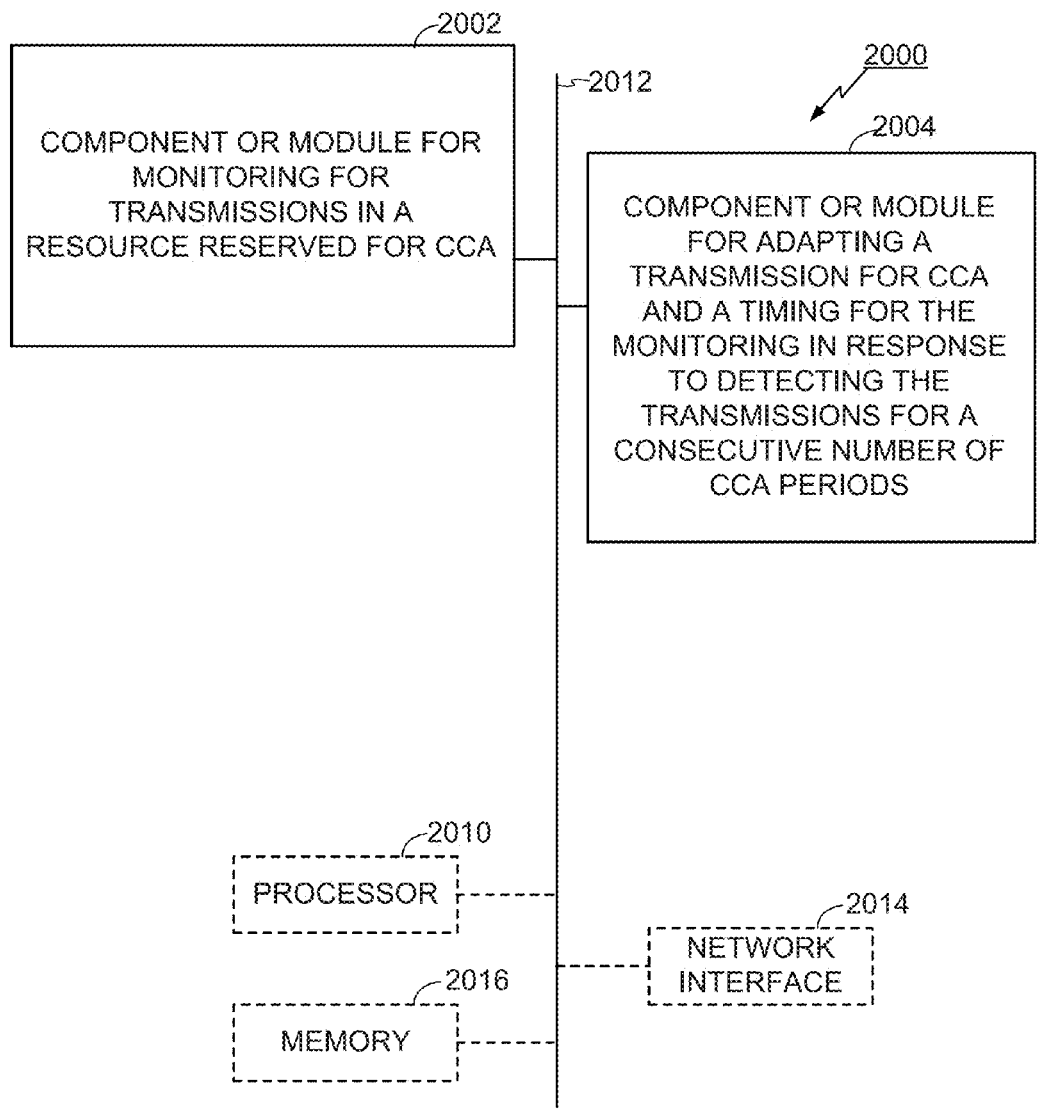
FIG. 20 illustrates an example apparatus for implementing the methodology of FIG. 14.

With reference to FIG. 20, there is provided an exemplary apparatus 2000 that may be configured as a wireless entity such as a UE, mobile entity, eNB, femto access point, or other suitable entity, or as a processor, component or similar device for use within the UE, mobile entity, eNB, femto access point, or other suitable entity, for CCA. The apparatus 2000 may include functional blocks that can represent functions implemented by a processor, software, or combination thereof (e.g., firmware).

As illustrated, in one embodiment, the apparatus 2000 may include an electrical component or module 2002 for monitoring for transmissions in a resource reserved for CCA. The apparatus 2000 may include an electrical component or module 2004 for adapting a transmission for CCA and a timing for the monitoring in response to detecting the transmissions for a consecutive number of CCA periods.

In related aspects, the apparatus 2000 may optionally include a processor component 2000 having at least one processor, in the case of the apparatus 2000 configured as a network entity. The processor 2000, in such case, may be in operative communication with the components 2002-2004 or similar components via a bus 2012 or similar communication coupling. The processor 2010 may effect initiation and scheduling of the processes or functions performed by electrical components or modules 2002-2004.

In further related aspects, the apparatus 2000 may include a network interface component 2014 for communicating with other network entities. The apparatus 2000 may optionally include a component for storing information, such as, for example, a memory device/component 2016. The computer readable medium or the memory component 2016 may be operatively coupled to the other components of the apparatus 2000 via the bus 2012 or the like. The memory component 2016 may be adapted to store computer readable instructions and data for performing the activity of the components 2002-2004, and subcomponents thereof, or the processor 2010. The memory component 2016 may retain instructions for executing functions associated with the components 2002-2004. While shown as being external to the memory 2016, it is to be understood that the components 2002-2004 can exist within the memory 2016.

Figure 21:
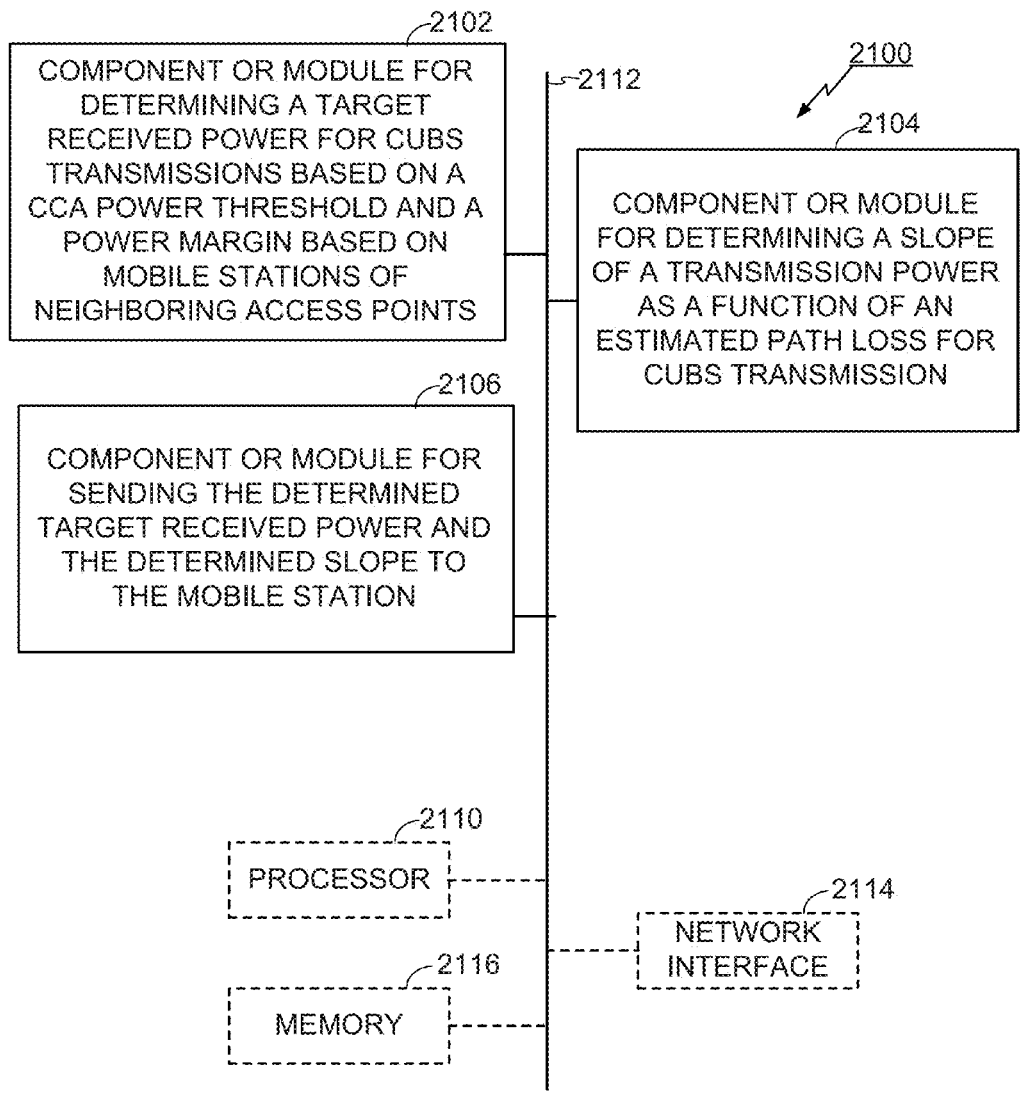
FIG. 21 illustrates an example apparatus for implementing the methodology of FIG. 15.

With reference to FIG. 21, there is provided an exemplary apparatus 2100 that may be configured as a wireless entity such as an eNB, femto access point, or other suitable entity, or as a processor, component or similar device for use within the eNB, femto access point, or other suitable entity, for CCA. The apparatus 2100 may include functional blocks that can represent functions implemented by a processor, software, or combination thereof (e.g., firmware).

As illustrated, in one embodiment, the apparatus 2100 may include an electrical component or module 2102 for determining a target received power for CUBS transmissions based on a CCA power threshold and a power margin based on mobile stations of neighboring access points. The apparatus 2100 may include an electrical component or module 2104 for determining a slope of a transmission power as a function of an estimated path loss for CUBS transmission. The apparatus 2100 may include an electrical component or module 2104 for sending the determined target received power and the determined slope to the mobile station.

In related aspects, the apparatus 2100 may optionally include a processor component 2100 having at least one processor, in the case of the apparatus 2100 configured as a network entity. The processor 2100, in such case, may be in operative communication with the components 2102-2106 or similar components via a bus 2112 or similar communication coupling. The processor 2110 may effect initiation and scheduling of the processes or functions performed by electrical components or modules 2102-2106.

In further related aspects, the apparatus 2100 may include a network interface component 2114 for communicating with other network entities. The apparatus 2100 may optionally include a component for storing information, such as, for example, a memory device/component 2116. The computer readable medium or the memory component 2116 may be operatively coupled to the other components of the apparatus 2100 via the bus 2112 or the like. The memory component 2116 may be adapted to store computer readable instructions and data for performing the activity of the components 2102-2106, and subcomponents thereof, or the processor 2110. The memory component 2116 may retain instructions for executing functions associated with the components 2102-2106. While shown as being external to the memory 2116, it is to be understood that the components 2102-2106 can exist within the memory 2116.

Figure 22:
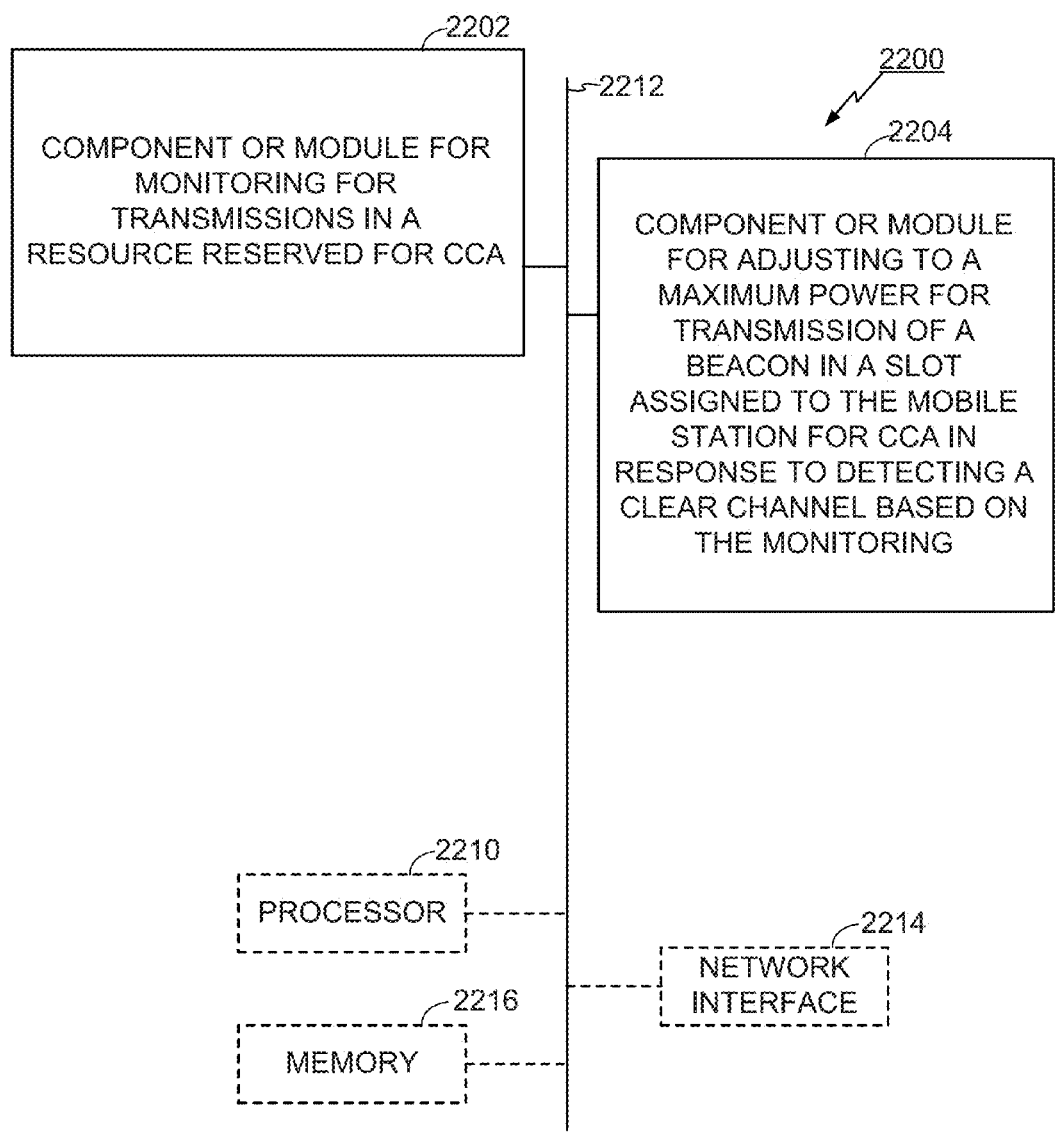
FIG. 22 illustrates an example apparatus for implementing the methodology of FIG. 16.

With reference to FIG. 22, there is provided an exemplary apparatus 2200 that may be configured as a wireless entity such as a UE, mobile entity, eNB, femto access point, or other suitable entity, or as a processor, component or similar device for use within the UE, mobile entity, eNB, femto access point, or other suitable entity, for CCA. The apparatus 2200 may include functional blocks that can represent functions implemented by a processor, software, or combination thereof (e.g., firmware).

As illustrated, in one embodiment, the apparatus 2200 may include an electrical component or module 2202 for monitoring for transmissions in a resource reserved for CCA. The apparatus 2200 may include an electrical component or module 2204 for adjusting to a maximum power for transmission of a beacon in a slot assigned to the mobile station for CCA in response to detecting a clear channel based on the monitoring.

In related aspects, the apparatus 2200 may optionally include a processor component 2200 having at least one processor, in the case of the apparatus 2200 configured as a network entity. The processor 2200, in such case, may be in operative communication with the components 2202-2204 or similar components via a bus 2212 or similar communication coupling. The processor 2210 may effect initiation and scheduling of the processes or functions performed by electrical components or modules 2202-2204.

In further related aspects, the apparatus 2200 may include a network interface component 2214 for communicating with other network entities. The apparatus 2200 may optionally include a component for storing information, such as, for example, a memory device/component 2216. The computer readable medium or the memory component 2216 may be operatively coupled to the other components of the apparatus 2200 via the bus 2212 or the like. The memory component 2216 may be adapted to store computer readable instructions and data for performing the activity of the components 2202-2204, and subcomponents thereof, or the processor 2210. The memory component 2216 may retain instructions for executing functions associated with the components 2202-2204. While shown as being external to the memory 2216, it is to be understood that the components 2202-2204 can exist within the memory 2216.

With reference to FIG. 23, there is provided an exemplary apparatus 2300 that may be configured as a wireless entity such as a UE, mobile entity, eNB, femto access point, or other suitable entity, or as a processor, component or similar device for use within the UE, mobile entity, eNB, femto access point, or other suitable entity, for CCA. The apparatus 2300 may include functional blocks that can represent functions implemented by a processor, software, or combination thereof (e.g., firmware).

As illustrated, in one embodiment, the apparatus 2300 may include an electrical component or module 2302 for monitoring for transmissions in a resource reserved for CCA. The apparatus 2300 may include an electrical component or module 2304 for detecting an energy of the transmissions over a shorter duration than an assigned slot in the resource reserved for CCA.

In related aspects, the apparatus 2300 may optionally include a processor component 2300 having at least one processor, in the case of the apparatus 2300 configured as a network entity. The processor 2300, in such case, may be in operative communication with the components 2302-2304 or similar components via a bus 2312 or similar communication coupling. The processor 2310 may effect initiation and scheduling of the processes or functions performed by electrical components or modules 2302-2304.

In further related aspects, the apparatus 2300 may include a network interface component 2314 for communicating with other network entities. The apparatus 2300 may optionally include a component for storing information, such as, for example, a memory device/component 2316. The computer readable medium or the memory component 2316 may be operatively coupled to the other components of the apparatus 2300 via the bus 2312 or the like. The memory component 2316 may be adapted to store computer readable instructions and data for performing the activity of the components 2302-2304, and subcomponents thereof, or the processor 2310. The memory component 2316 may retain instructions for executing functions associated with the components 2302-2304. While shown as being external to the memory 2316, it is to be understood that the components 2302-2304 can exist within the memory 2316.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for performing clear channel assessment (CCA) in LTE-U, the method comprising:
    monitoring for transmissions in a resource reserved for CCA;
    detecting an energy of the transmissions over a shorter duration than an assigned slot in the resource reserved for CCA;
    transmitting a beacon in a slot assigned to a wireless entity for CCA based on detecting a clear channel based on the monitoring; and
    adapting the beacon transmission and a timing for the monitoring based on detecting the transmissions for a consecutive number of CCA periods, wherein adapting the beacon transmission comprises transmitting the beacon in an auxiliary resource reserved for CCA.

2. The method of claim 1, wherein the shorter duration is based on at least one guard period at edges of the assigned slot.

3. The method of claim 1, wherein the transmissions follow a timing mask having an off time period with a first predetermined time offset before an orthogonal frequency division multiplexing (OFDM) symbol boundary, and an on period with a second predetermined time offset after the OFDM symbol boundary.

4. The method of claim 1, further comprising:
    biasing timing for the transmissions to determine blocking by intra-PLMN nodes.

5. The method of claim 1, further comprising:
    adjusting to a maximum power for transmission of a beacon in a slot assigned to a mobile station for CCA based on detecting a clear channel based on the monitoring.

6. An apparatus for performing clear channel assessment (CCA) in LTE-U, the apparatus comprising:
    means for monitoring for transmissions in a resource reserved for CCA;
    means for detecting an energy of the transmissions over a shorter duration than an assigned slot in the resource reserved for CCA;
    means for transmitting a beacon in a slot assigned to a wireless entity for CCA based on detecting a clear channel based on the monitoring; and
    means for adapting the beacon transmission and a timing for the monitoring based on detecting the transmissions for a consecutive number of CCA periods, wherein adapting the beacon transmission comprises transmitting the beacon in an auxiliary resource reserved for CCA.

7. The apparatus of claim 6, wherein the shorter duration is based on at least one guard period at edges of the assigned slot.

8. The apparatus of claim 6, wherein the transmissions follow a timing mask having an off time period with a first predetermined time offset before an orthogonal frequency division multiplexing (OFDM) symbol boundary, and an on period with a second predetermined time offset after the OFDM symbol boundary.

9. The apparatus of claim 6, further comprising:
means for biasing timing for the transmissions to determine blocking by intra-PLMN nodes.

10. The apparatus of claim 6, further comprising:
means for adjusting to a maximum power for transmission of a beacon in a slot assigned to a mobile station for CCA based on detecting a clear channel based on the monitoring.

11. An apparatus for performing clear channel assessment (CCA) in LTE-U, the apparatus comprising:
at least one transceiver configured for monitoring transmissions in a resource reserved for CCA;
at least one processor configured for detecting an energy of the transmissions over a shorter duration than an assigned slot in the resource reserved for CCA, wherein the at least one transceiver is further configured for transmitting a beacon in a slot assigned to a wireless entity for CCA based on detecting a clear channel based on the monitoring, wherein the at least one processor is further configured for adapting the beacon transmission and a timing for the monitoring based on detecting the transmissions for a consecutive number of CCA periods, and wherein adapting the beacon transmission comprises transmitting the beacon in an auxiliary resource reserved for CCA; and
a memory coupled to the at least one processor for storing data.

12. The apparatus of claim 11, wherein the shorter duration is based on at least one guard period at edges of the assigned slot.

13. The apparatus of claim 11, wherein the transmissions follow a timing mask having an off time period with a first predetermined time offset before an orthogonal frequency division multiplexing (OFDM) symbol boundary, and an on period with a second predetermined time offset after the OFDM symbol boundary.

14. The apparatus of claim 11, means the at least one processor is further configured for biasing timing for the transmissions to determine blocking by intra-PLMN nodes.

15. The apparatus of claim 11, wherein the at least one processor is further configured for adjusting to a maximum power for transmission of a beacon in a slot assigned to a mobile station for CCA based on detecting a clear channel based on the monitoring.

16. A non-transitory computer-readable medium storing instructions, the instructions comprising:
one or more instructions that, when executed by at least one computer, cause the at least one computer to:
monitor transmissions in a resource reserved for clear channel assessment (CCA);
detect an energy of the transmissions over a shorter duration than an assigned slot in the resource reserved for CCA;
transmit a beacon in a slot assigned to a wireless entity for CCA based on detecting a clear channel based on the monitoring; and
adapt the beacon transmission and a timing for the monitoring based on detecting the transmissions for a consecutive number of CCA periods, wherein adapting the beacon transmission comprises transmitting the beacon in an auxiliary resource reserved for CCA.

17. The non-transitory computer readable medium of claim 16, wherein the shorter duration is based on at least one guard period at edges of the assigned slot.

18. The non-transitory computer readable medium of claim 16, wherein the transmissions follow a timing mask having an off time period with a first predetermined time offset before an orthogonal frequency division multiplexing (OFDM) symbol boundary, and an on period with a second predetermined time offset after the OFDM symbol boundary.

19. The non-transitory computer readable medium of claim 16, wherein the instructions further comprise:
one or more instructions that, when executed by the at least one computer, cause the at least one computer to:
bias timing for the transmissions to determine blocking by intra-PLMN nodes.

20. The non-transitory computer readable medium of claim 16, wherein the instructions further comprise:
one or more instructions that, when executed by the at least one computer, cause the at least one computer to:
adjust to a maximum power for transmission of a beacon in a slot assigned to a mobile station for CCA based on detecting a clear channel based on the monitoring.

21. A method for an access point performing timing advance in LTE-U, the method comprising:
receiving, from each of a plurality of mobile stations, at least one message comprising timing information; and
determining, using the received timing information, at least one timing advance parameter for channel usage beacon signals (CUBS) transmission and an associated clear channel assessment (CCA) window for at least one mobile station based on reducing a timing difference between the plurality of mobile stations.

22. The method of claim 21, wherein the at least one message comprises at least one of a random access preamble or at least one Rx-Tx timing difference report comprising the timing information.

23. The method of claim 21, wherein a transmit timing of CUBS is different from a transmit timing of PUSCH, the method further comprising:
transmitting at least two timing advance commands to a same mobile station.

24. The method of claim 21, wherein a transmit timing of CUBS is the same as a transmit timing from a PUSCH.

25. The method of claim 21, further comprising:
performing, at the access point, uplink power control for a mobile station that needs to perform CCA in LTE-U, the performing comprising:
determining a target received power for CUBS transmissions based on a CCA power threshold and a power margin based on mobile stations of neighboring access points;
determining a slope of a transmission power as a function of an estimated path loss for CUBS transmission; and
sending the determined target received power and the determined slope to the mobile station.

26. The method of claim 25, wherein the power margin is further based on an antenna gain difference plus a path loss difference.

27. The method of claim 25, wherein the slope is determined such that CUBS transmissions have a similar power level for mobile stations with small path losses and with large path losses.

28. The method of claim 25, wherein the slope is determined such that CUBS transmissions have higher power for mobile stations with smaller path losses.

29. An apparatus for performing timing advance in LTE-U, the apparatus comprising:
   means for receiving, from each of a plurality of mobile stations, at least one message comprising timing information; and
   means for determining, using the received timing information, at least one timing advance parameter for channel usage beacon signals (CUBS) transmission and an associated CCA window for at least one mobile station based on reducing a timing difference between the plurality of mobile stations.

30. The apparatus of claim 29, further comprising:
   means for performing uplink power control for a mobile station that needs to perform clear channel assessment CCA in LTE-U, the means for performing comprising:
   means for determining a target received power for CUBS transmissions based on a CCA power threshold and a power margin based on mobile stations of neighboring access points;
   means for determining a slope of a transmission power as a function of an estimated path loss for CUBS transmission; and
   means for sending the determined target received power and the determined slope to the mobile station.

31. An apparatus for performing timing advance in LTE-U, the apparatus comprising:
   at least one transceiver configured for receiving, from a plurality of mobile stations, at least one message comprising timing information;
   at least one processor configured for determining, using the received timing information, at least one timing advance parameter for channel usage beacon signals (CUBS) transmission and an associated CCA window for at least one mobile station based on reducing a timing difference between the plurality of mobile stations; and
   a memory coupled to the at least one processor for storing data.

32. The apparatus of claim 31,
   wherein the at least one processor is further configured for performing uplink power control for a mobile station that needs to perform clear channel assessment CCA in LTE-U, and
   wherein, when performing the uplink power control, the processor is configured for:
      determining a target received power for CUBS transmissions based on a CCA power threshold and a power margin based on mobile stations of neighboring access points; and
      determining a slope of a transmission power as a function of an estimated path loss for CUBS transmission.

33. The apparatus of claim 32, wherein the at least one transceiver is further configured for sending the determined target received power and the determined slope to the mobile station.

34. A non-transitory computer-readable medium storing instructions, the instructions comprising:
   one or more instructions that, when executed by at least one computer, cause the at least one computer to:
      receive, from each of a plurality of mobile stations, at least one message comprising timing information; and
      determine, using the received timing information, at least one timing advance parameter for channel usage beacon signals (CUBS) transmission and an associated CCA window for at least one mobile station based on reducing a timing difference between the plurality of mobile stations.

35. The non-transitory computer-readable medium of claim 34, wherein the instructions further comprise:
   one or more instructions that, when executed by the at least one computer, cause the at least one computer to:
      determine a target received power for CUBS transmissions based on a CCA power threshold and a power margin based on mobile stations of neighboring access points;
      determine a slope of a transmission power as a function of an estimated path loss for CUBS transmission; and
      send the determined target received power and the determined slope to the mobile station.

36. The non-transitory computer-readable medium of claim 35, wherein the power margin is further based on an antenna gain difference plus a path loss difference.

37. The non-transitory computer-readable medium of claim 34, wherein the at least one message comprises at least one of a random access preamble or at least one Rx-Tx timing difference report comprising the timing information.

38. The non-transitory computer-readable medium of claim 34,
   wherein a transmit timing of CUBS is different from a transmit timing of PUSCH, and
   wherein the instructions further comprise:
      one or more instructions that, when executed by the at least one computer, cause the at least one computer to:
         transmit at least two timing advance commands to a same mobile station.

39. The apparatus of claim 30, wherein the slope is determined such that CUBS transmissions have a similar power level for mobile stations with small path losses and with large path losses.

40. The apparatus of claim 29, wherein a transmit timing of CUBS is the same as a transmit timing from a PUSCH.

41. The apparatus of claim 29, wherein the at least one message comprises at least one of a random access preamble or at least one Rx-Tx timing difference report comprising the timing information.

42. The apparatus of claim 29, wherein a transmit timing of CUBS is different from a transmit timing of PUSCH.

43. The apparatus of claim 29, wherein the apparatus further comprises:
   transmitting at least two timing advance commands to a same mobile station.

44. The apparatus of claim 32, wherein the slope is determined such that CUBS transmissions have a similar power level for mobile stations with small path losses and with large path losses.

45. The apparatus of claim 31, wherein the at least one message comprises at least one of a random access preamble or at least one Rx-Tx timing difference report comprising the timing information.

46. The apparatus of claim 31, wherein a transmit timing of CUBS is the same as a transmit timing from a PUSCH.

* * * * *